(12) United States Patent
Chen et al.

(10) Patent No.: US 11,533,451 B2
(45) Date of Patent: Dec. 20, 2022

(54) SYSTEM AND METHOD FOR FRAME RATE UP-CONVERSION OF VIDEO DATA

(71) Applicant: BEIJING DAJIA INTERNET INFORMATION TECHNOLOGY CO., LTD., Beijing (CN)

(72) Inventors: Yi-Wen Chen, San Diego, CA (US); Xianglin Wang, San Diego, CA (US); Shuiming Ye, San Diego, CA (US); Guoxin Jin, San Diego, CA (US); Shufei Fan, San Diego, CA (US); Bing Yu, Beijing (CN)

(73) Assignee: BEIJING DAJIA INTERNET INFORMATION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/380,172

(22) Filed: Jul. 20, 2021

(65) Prior Publication Data

US 2022/0060656 A1   Feb. 24, 2022

Related U.S. Application Data

(60) Provisional application No. 63/068,984, filed on Aug. 21, 2020.

(51) Int. Cl.
*H04N 7/01* (2006.01)
*H04N 5/14* (2006.01)

(52) U.S. Cl.
CPC .......... *H04N 7/0127* (2013.01); *H04N 5/145* (2013.01)

(58) Field of Classification Search
CPC ...... H04N 7/0127; H04N 5/145; H04N 7/014; H04N 19/139; H04N 19/513; H04N 19/85
See application file for complete search history.

(56) References Cited

U.S. PATENT DOCUMENTS

| | | | | |
|---|---|---|---|---|
| 8,902,359 B1* | 12/2014 | Biswas | ................ | H04N 7/0132 348/452 |
| 9,621,841 B1* | 4/2017 | Hong | ...................... | G06T 7/223 |
| 9,900,550 B1* | 2/2018 | Chou | ...................... | G06T 7/248 |
| 2011/0142389 A1* | 6/2011 | Takeuchi | ............ | F16C 33/4635 384/572 |
| 2013/0170551 A1* | 7/2013 | Liu | ........................ | H04N 19/61 348/E7.003 |
| 2018/0176574 A1* | 6/2018 | Tang | .................... | H04N 19/543 |
| 2018/0374218 A1* | 12/2018 | Avidor | .................... | G06T 7/238 |
| 2019/0124337 A1* | 4/2019 | Ruefenacht | ............ | H04N 19/85 |
| 2019/0262000 A1* | 8/2019 | Vidlund | ........... | A61B 17/12036 |

* cited by examiner

*Primary Examiner* — Michael Lee
(74) *Attorney, Agent, or Firm* — Bayes PLLC

(57) ABSTRACT

Embodiments of the disclosure provide systems and methods for performing frame rate up-conversion of video data including a sequence of image frames. The method may include determining a set of motion vectors of a target frame relative to a plurality of reference frames. The target frame is to be generated and interpolated into the sequence of image frames. The method may further include performing a motion vector classification on the set of motion vectors to generate a target object map for the target frame. The method may additionally include projecting the target object map onto the plurality of reference frames to generate a plurality of reference object maps based on the set of motion vectors. The method may additionally include detecting an occlusion area in the target frame based on the set of motion vectors, the target object map, and the plurality of reference object maps.

20 Claims, 15 Drawing Sheets

SYSTEM AND METHOD FOR FRAME RATE UP-CONVERSION OF VIDEO DATA

CROSS REFERENCE TO RELATED APPLICATION

This application claims the benefit of priority under 35 USC § 119(e) to U.S. Application No. 63/068,984, filed on Aug. 21, 2020, entitled "METHODS AND APPARATUS FOR FRAME RATE UP CONVERSION," which is hereby incorporated by reference in its entirety.

TECHNICAL FIELD

The present disclosure relates to the field of video processing, and more particularly relates to methods and systems for performing frame rate up-conversion (FRUC) of video data using multiple reference frames and variable block sizes.

BACKGROUND

FRUC can be applied to improve visual quality of video data by converting an input video with a lower frame rate to an output video with a higher frame rate. For example, an input video with 30 frames per second (fps) can be converted into an output video with 60 fps, 120 fps, or another higher frame rate. Compared to the input video, the output video with a higher frame rate may provide smoother motion and a more pleasant viewing experience for a user.

FRUC can also be useful in low bandwidth applications. For example, some frames in a video may be dropped in an encoding process at a transmitter side so that the video can be transmitted with a lower bandwidth. Afterwards, the dropped frames can be re-generated through interpolation during a decoding process at a receiver side. For example, a frame rate of the video may be reduced by half by dropping every other frame in the encoding process at the transmitter side, and then at the receiver side, the frame rate may be recovered through frame interpolation using FRUC.

Existing FRUC methods can be mainly classified into three categories. The first category of methods interpolates additional frames using a number of received video frames without taking the complex motion model into account. The frame repetition method and the frame averaging methods are two typical examples of this category. In the frame repetition method, the frame rate is increased by simply repeating or duplicating the received frames. In the frame averaging method, additional frames are interpolated by weighted averaging of multiple received frames. Given the simplistic processing of these methods, the drawbacks of these methods are also obvious which include the production of motion jerkiness or blurring of moving objects when the video content contains moving objects with complex motion. The second category, the so-called motion compensated FRUC (MC-FRUC), is more advanced in that it utilizes the motion information to perform the motion compensation (MC) to generate the interpolated frames. The third category utilizes neural network. For example, through neural network and deep learning, a synthesis network may be trained and developed to produce interpolated frames. Motion field information, which is derived using either the conventional motion estimation or the deep learning-based approaches, may also be fed into the network for frame interpolation.

In existing FRUC methods, when one block is detected as "covered-and-uncovered", there is no proper reference frame to perform motion compensation because the correct reference block/pixels do not exist in either the previous reference frame or the next reference frame. Although hole filling methods may help in some cases, proper handling of this case is still the most challenging part for the FRUC.

This disclosure provides improved methods and systems for MC-FRUC that use multiple reference frames and variable block sizes.

SUMMARY

Embodiments of the disclosure provide a method for performing frame rate up-conversion of video data including a sequence of image frames. The method may include determining, by a video processor, a set of motion vectors of a target frame relative to a plurality of reference frames. The target frame is to be generated and interpolated into the sequence of image frames. The method may further include performing, by the video processor, a motion vector classification on the set of motion vectors to generate a target object map for the target frame. The method may additionally include projecting, by the video processor, the target object map onto the plurality of reference frames to generate a plurality of reference object maps based on the set of motion vectors. The method may additionally include detecting, by the video processor, an occlusion area in the target frame based on the set of motion vectors, the target object map, and the plurality of reference object maps.

Embodiments of the disclosure also provide a system for performing frame rate up-conversion of video data including a sequence of image frames. The system may include a memory configured to store the sequence of image frames. The system may further include a video processor configured to determine a set of motion vectors of a target frame relative to a plurality of reference frames. The target frame is to be generated and interpolated into the sequence of image frames. The video processor may be further configured to perform a motion vector classification on the set of motion vectors to generate a target object map for the target frame. The video processor may be additionally configured to project the target object map onto the plurality of reference frames to generate a plurality of reference object maps based on the set of motion vectors. The video processor may be additionally configured to detect an occlusion area in the target frame based on the set of motion vectors, the target object map, and the plurality of reference object maps.

Embodiments of the disclosure also provide a non-transitory computer-readable storage medium configured to store instructions which, when executed by a video processor, cause the video processor to perform a process for performing frame rate up-conversion of video data including a sequence of image frames. The video process may include determining a set of motion vectors of a target frame relative to a plurality of reference frames. The target frame is to be generated and interpolated into the sequence of image frames. The video process may further include performing a motion vector classification on the set of motion vectors to generate a target object map for the target frame. The video process may additionally include projecting the target object map onto the plurality of reference frames to generate a plurality of reference object maps based on the set of motion vectors. The video process may additionally include detecting an occlusion area in the target frame based on the set of motion vectors, the target object map, and the plurality of reference object maps.

It is to be understood that both the foregoing general description and the following detailed description are exemplary and explanatory only and are not restrictive of the invention, as claimed.

DETAILED DESCRIPTION

Figure 1:
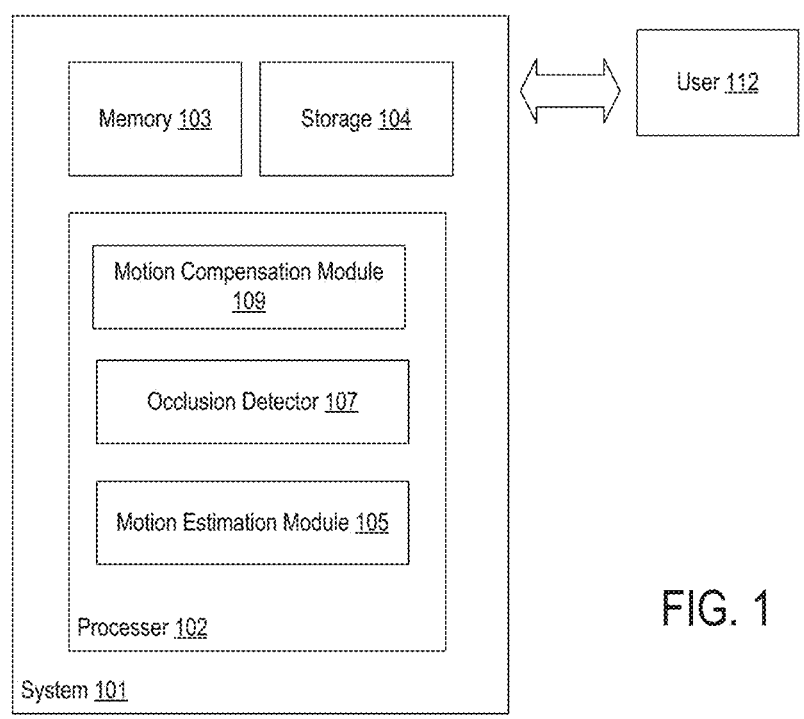
FIG. 1 illustrates a block diagram of an exemplary system for performing FRUC of video data, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

MC-FRUC techniques may include interpolating additional frames into the video using motion compensation of moving objects. Motion information of the moving objects may be utilized to perform the motion compensation such that interpolated frames can be generated with smoother motion. Generally, a MC-FRUC system may include a motion estimation module, an occlusion detector, and a motion compensation module. The motion estimation module may determine motion vectors of an interpolated frame (also referred to as a target frame herein) relative to one or more reference frames based on a distortion metric. The occlusion detector may detect whether an occlusion scenario occurs in the target frame. Responsive to detecting that the occlusion scenario occurs, the occlusion detector may determine an occlusion area where the occlusion scenario occurs in the target frame.

In some implementations, through motion trajectory tracking, the occlusion detector may detect a non-occluded area, an occlusion area, or both, in the target frame. The motion compensation module may generate image content (or pixel values) for the non-occluded area by referencing both of a nearest previous frame (a reference frame immediately preceding the target frame) and a nearest next frame (a reference frame immediately subsequent to the target frame). The occlusion area can include, for example, a covered occlusion area, an uncovered occlusion area, or a combined occlusion area. For each of the covered occlusion area and the uncovered occlusion area, the motion compensation module may generate image content (or pixel values) for the area in the target frame by referencing either the nearest previous or the nearest next frame. To reduce blocking artifacts and improve visual quality, an overlapped block motion compensation (OBMC) technique may also be used.

For example, assuming that an area (e.g., a number of pixels or a block of pixels) in the target frame is detected to have a "covered" occlusion status relative to the nearest previous and next frames, which means that the area is revealed in the nearest previous frame but covered by one or more other objects in the nearest next frame. This area may be referred to as a covered occlusion area. For each target block in the area, no matched block (or no matched pixels) for the target block can be found in the nearest next frame. Only a corresponding reference block (or a corresponding block of pixels) in the nearest previous frame can be determined as a matched block and used for motion compensation of the target block.

In another example, assuming that an area in the target frame is detected to have an "uncovered" occlusion status, which means that the area is covered in the nearest previous frame but revealed in the nearest next frame. This area may be referred to as an uncovered occlusion area. For each target block in the area, no matched block can be found for the target block from the nearest previous frame. Only a corresponding reference block in the nearest next frame can be determined as a matched block and used for motion compensation of the target block.

In yet another example, assuming that an area is detected to have a combined occlusion status (e.g., a "covered-and-uncovered" occlusion status), which means that the area is covered (not revealed) in both the nearest previous frame and the nearest next frame. This area may be referred to as a combined occlusion area. For example, the area is covered by one or more first objects in the nearest previous frame and also covered by one or more second objects in the nearest next frame, such that the area is not revealed in both the nearest previous frame and the nearest next frame. For each target block in the area, no matched block can be found for the target block from the nearest previous frame and the nearest next frame. In this case, additional processing may be needed for interpolating pixels in the target block. For example, a hole filling method such as spatial interpolation (e.g., image inpainting) may be used to fill in the area.

However, since no matched block can be found for each target block in the combined occlusion area from the nearest previous and next frames, motion jerkiness or blurring of moving objects can be incurred if image content of the combined occlusion area includes moving objects with complex motion. A video viewing experience can be degraded due to the motion jerkiness or blurring of the moving objects. A proper handling of the occlusion area (particularly, the combined occlusion area) of the target frame can be a challenge in FRUC in order to improve a visual quality of the video data.

In this disclosure, an object-based MC-FRUC technique is provided herein. More specifically, systems and methods for performing FRUC of video data using a plurality of reference frames and variable block sizes are disclosed. The object-based MC-FRUC technique described herein can properly handle an occlusion area of a target frame using a plurality of reference frames rather than merely using the two nearest reference frames such as the nearest previous frame and the nearest next frame.

For example, for a target block that is included in a combined ("covered-and-uncovered") occlusion area, because no matched block can be found for the target block from the two nearest reference frames, the object-based MC-FRUC technique described herein can reference to additional reference frames (rather than merely the two nearest reference frames). The object-based MC-FRUC technique described herein can obtain one or more matched blocks for the target block from the additional reference frames. In this case, this target block is no longer classified into the combined occlusion status and can be removed from the combined occlusion area. This target block can be converted into a non-occluded target block, a covered occlusion target block, or an uncovered occlusion target block, depending on a quantity of the one or more matched blocks and in which additional reference frame(s) the one or more matched blocks can be found. As a result, image content (or pixels) of the target block can be generated based on the one or more matched blocks, so that potential motion jerkiness or blurring of moving objects can be reduced or eliminated in the video data. A visual quality of the video data can be improved.

Consistent with the disclosure, the object-based MC-FRUC technique disclosed herein can improve a video presentation capability of a video processor (or video processing computer). Thus, a video viewing experience provided through the video processor (or video processing computer), or through a display coupled to the video processor (or video processing computer), can be enhanced. For example, by reducing potential motion jerkiness or blurring of moving objects that can be incurred during FRUC, a video display quality can be improved. Motion artifacts can be reduced in the video data such that the processor (or computer) can display a video with smoother motion.

Consistent with the disclosure, the object-based MC-FRUC technique disclosed herein provides a specific, detailed solution for improving the video display quality when FRUC is applied. Specifically, through a series of operations including (1) performing a motion vector classification on a set of motion vectors of the target frame to generate a target object map for the target frame and (2) projecting the target object map onto a plurality of reference frames to generate a plurality of reference object maps for the plurality of reference frames, an occlusion detection on the target frame can be improved (or refined) based on the set of motion vectors, the target object map, and the plurality of reference object maps. For example, for a "covered-and-uncovered" occlusion target block with no matched block found in the two nearest previous and next frames, more reference frames can be used to determine one or more matched blocks for the target block, so that image content of the target block can be generated based on the one or more matched blocks to reduce potential motion artifacts. Further description for this specific, detailed solution for improving the video display quality when FRUC is applied is provided below in more detail.

FIG. 1 illustrates a block diagram 100 of an exemplary system 101 for performing FRUC of video data, according to embodiments of the disclosure. In some embodiments, system 101 may be embodied on a device that a user 112 can interact with. For example, system 101 may be implemented on a server (e.g., a local server or a cloud server), a working station, a play station, a desktop computer, a laptop computer, a tablet computer, a smartphone, a game controller, a wearable electronic device, a television (TV) set, or any other suitable electronic device.

In some embodiments, system 101 may include at least one processor, such as a processor 102, at least one memory, such as a memory 103, and at least one storage, such as a storage 104. It is understood that system 101 may also include any other suitable components for performing functions described herein.

In some embodiments, system 101 may have different modules in a single device, such as an integrated circuit (IC) chip, or separate devices with dedicated functions. For example, the IC may be implemented as an application-specific integrated circuit (ASIC) or a field-programmable gate array (FPGA). In some embodiments, one or more components of system 101 may be located in a cloud computing environment or may be alternatively in a single location or distributed locations. Components of system 101 may be in an integrated device or distributed at different locations but communicate with each other through a network (not shown in the figure).

Processor 102 may include any appropriate type of microprocessor, graphics processor, digital signal processor, or microcontroller suitable for video processing. Processor 102 may include one or more hardware units (e.g., portion(s) of an integrated circuit) designed for use with other components or to execute part of a video processing program. The program may be stored on a computer-readable medium, and when executed by processor 102, it may perform one or more functions. Processor 102 may be configured as a separate processor module dedicated to performing FRUC. Alternatively, processor 102 may be configured as a shared processor module for performing other functions unrelated to performing FRUC.

In some embodiments, processor 102 can be a specialized processor customized for video processing. For example, processor 102 can be a graphics processing unit (GPU), which is a specialized electronic circuit designed to rapidly manipulate and alter memory to accelerate the creation of images in a frame buffer intended for output to a display device. Functions disclosed herein can be implemented by the GPU. In another example, system 101 can be implemented in a system on chip (SoC), and processor 102 may be a media and pixel processing (MPP) processor configured to run video encoder or decoder applications. In some embodiments, functions disclosed herein can be implemented by the MPP processor.

Processor 102 may include several modules, such as a motion estimation module 105, an occlusion detector 107, and a motion compensation module 109. Although FIG. 1 shows that motion estimation module 105, occlusion detector 107, and motion compensation module 109 are within one processor 102, they may be likely implemented on different processors located closely or remotely with each other.

Motion estimation module 105, occlusion detector 107, and motion compensation module 109 (and any corresponding sub-modules or sub-units) can be hardware units (e.g., portions of an integrated circuit) of processor 102 designed for use with other components or software units implemented by processor 102 through executing at least part of a program. The program may be stored on a computer-readable medium, such as memory 103 or storage 104, and when executed by processor 102, it may perform one or more functions.

Memory 103 and storage 104 may include any appropriate type of mass storage provided to store any type of information that processor 102 may need to operate. For example, memory 103 and storage 104 may be a volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 103 and/or storage 104 may be configured to store one or more computer programs that may be executed by processor 102 to perform functions disclosed herein. For example, memory 103 and/or storage 104 may be configured to store program(s) that may be executed by processor 102 to perform FRUC. Memory 103 and/or storage 104 may be further configured to store information and data used by processor 102.

Figure 2A:
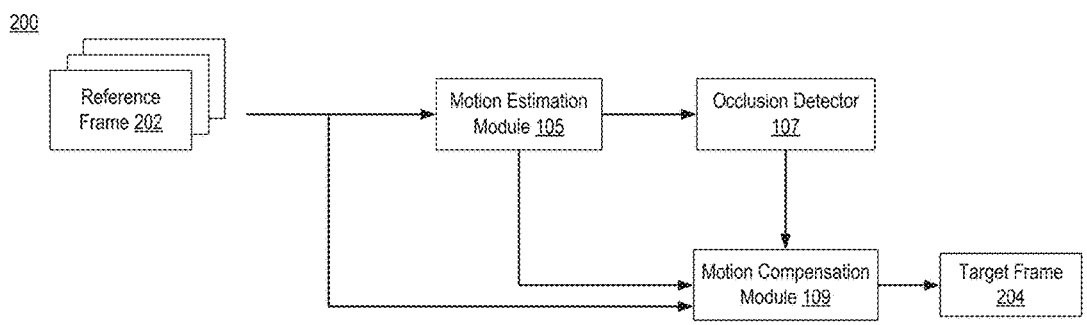
FIG. 2A illustrates a block diagram of an exemplary process for performing FRUC of video data, according to embodiments of the disclosure.
Figure 2B:
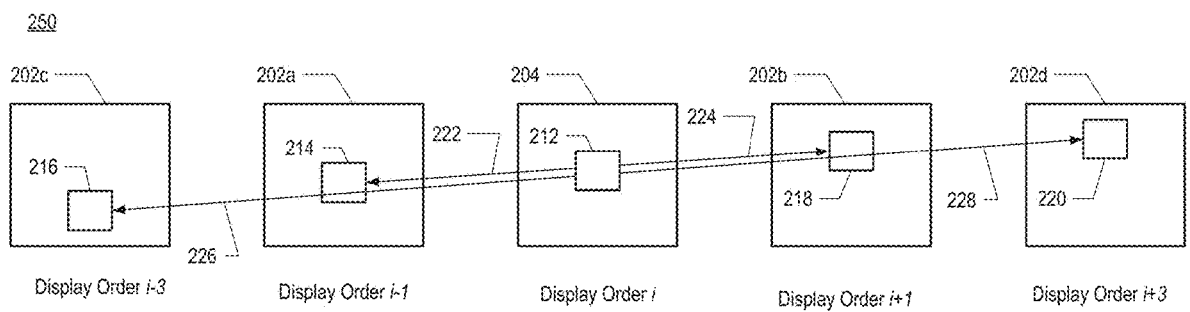
FIG. 2B is a graphical representation illustrating an interpolation process of a target frame based on a plurality of reference frames, according to embodiments of the disclosure.

FIG. 2A illustrates a block diagram of an exemplary process 200 for performing FRUC of video data, according to embodiments of the disclosure. FIG. 2B is a graphical representation illustrating an interpolation process 250 of a target frame (e.g., a target frame 204) based on a plurality of reference frames, according to embodiments of the disclosure. The video data may include a sequence of image frames, and target frame 204 may be an interpolated frame to be inserted into the sequence of image frames. With combined reference to FIGS. 2A-2B, the object-based MC-FRUC technique disclosed herein may be implemented to generate target frame 204 using a plurality of reference frames 202. The plurality of reference frames 202 may include a plurality of original image frames in the video data that can be used for the generation and interpolation of target frame 204.

For example, as shown in FIG. 2B, the plurality of reference frames 202 may include a first previous frame 202a preceding target frame 204, a first next frame 202b subsequent to target frame 204, a second previous frame 202c preceding first previous frame 202a, and a second next frame 202d subsequent to first next frame 202b. Although four reference frames are shown in FIG. 2B, the number of reference frames used for the generation and interpolation of target frame 204 may vary depending on a specific application. Target frame 204 can be temporally located at a position with a display order (or time stamp) of i, where i is a positive integer. Second previous frame 202c, first previous frame 202a, first next frame 202b, and second next frame 202d may be located at positions with display orders of i−3, i−1, i+1, and i+3, respectively. Although not shown in FIG. 2B, additional target frames may also be interpolated at positions with display orders of i−4, i−2, i+2, i+4, etc., respectively.

In some embodiments, target frame 204 may be divided into a plurality of target blocks with a size of N×M pixels per block, where N and M are positive integers. N indicates the number of pixels along a vertical direction in a target block, and M indicates the number of pixels along a horizontal direction in the target block. In some embodiments, each of the plurality of target blocks may have a variable block size (e.g., the block size is not fixed and can be varied depending on a specific application). Similarly, each reference frame 202 may be divided into a plurality of reference blocks with a size of N×M pixels per block.

Referring to FIG. 2A, motion estimation module 105 may be configured to receive the plurality of reference frames 202 and determine a set of motion vectors for target frame 204 relative to the plurality of reference frames 202. For example, for each target block in target frame 204, motion estimation module 105 may determine a plurality of motion vectors of the target block relative to the plurality of reference frames 202, respectively, as described below in more detail.

In some embodiments, the plurality of reference frames 202 may include a first previous frame preceding target frame 204 (e.g., first previous frame 202a immediately preceding target frame 204) and a first next frame subsequent to target frame 204 (e.g., first next frame 202b immediately subsequent to target frame 204). For each target block in target frame 204, motion estimation module 105 may determine a motion vector of the target block relative to the first previous frame and a motion vector of the target block relative to the first next frame.

For example, referring to FIG. 2B, for a target block 212 of target frame 204, motion estimation module 105 may determine a motion vector 222 of target block 212 relative to first previous frame 202a and a motion vector 224 of target block 212 relative to first next frame 202b using an exemplary motion estimation technique described below with reference to FIG. 7, 8A, or 8B.

In some embodiments, the plurality of reference frames 202 may further include one or more second previous frames preceding the first previous frame (e.g., second previous frame 202c immediately preceding first previous frame 202a) and one or more second next frames subsequent to the first next frame (e.g., second next frame 202d immediately subsequent to first next frame 202b). For each target block in target frame 204, motion estimation module 105 may be further configured to scale the motion vector of the target block relative to the first previous frame to generate a corresponding motion vector of the target block relative to each second previous frame. Also, motion estimation module 105 may be further configured to scale the motion vector of the target block relative to the first next frame to generate a corresponding motion vector of the target block relative to each second next frame.

For example, referring to FIG. 2B, motion estimation module 105 may scale motion vector 222 of target block 212 relative to first previous frame 202a to generate a motion vector 226 of target block 212 relative to second previous frame 202c. Also, motion estimation module 105 may scale motion vector 224 of target block 212 relative to first next frame 202b to generate a motion vector 228 of target block 212 relative to second next frame 202d. An exemplary motion vector scaling process is described below in more detail with reference to FIG. 9.

Occlusion detector 107 may be configured to receive the set of motion vectors of target frame 204 from motion estimation module 105 and perform a motion vector classification on the set of motion vectors to generate a target object map for target frame 204, as described below in more detail.

In some embodiments, occlusion detector 107 may perform a motion vector classification on the set of motion vectors to detect one or more objects in target frame 204. For example, occlusion detector 107 may classify the set of motion vectors into one or more groups of motion vectors. In this case, similar motion vectors (e.g., motion vectors with an identical or a similar velocity) can be classified into the same group. For example, a k-nearest neighbor (k-NN) algorithm can be used to perform the motion vector classification. Then, for each group of motion vectors, occlusion detector 107 may determine one or more target blocks from target frame 204, each of which has a respective motion vector being classified into the group of motion vectors. Occlusion detector 107 may determine an object corresponding to the group of motion vectors to be an image area including the one or more target blocks of target frame 204. By performing similar operations for each group of motion vectors, occlusion detector 107 may determine one or more objects corresponding to the one or more groups of motion vectors.

Consistent with the disclosure, two motion vectors can be considered as similar motion vectors if a difference between their velocities is within a predetermined threshold. For example, if an angle difference and an amplitude difference between velocities of two motion vectors are within a predetermined angle threshold and a predetermined amplitude threshold, respectively, then the two motion vectors can be considered as similar motion vectors. The predetermined angle threshold can be ±5%, ±10%, ±15%, or another suitable value. The predetermined amplitude threshold can be ±5%, ±10%, ±15%, or another suitable value.

Consistent with the disclosure, an object can be an image area of the image frame with identical or similar motion vectors. An object disclosed herein may include multiple real-world objects. For example, multiple real-world objects may be detected as a background object in an object map if these real-world objects have a zero-motion vector.

In some embodiments, occlusion detector 107 may generate a target object map for target frame 204 to include the one or more objects detected in target frame 204. For example, the target object map may depict the one or more objects and indicate which of the one or more objects each target block of target frame 204 belongs to. The generation of an exemplary target object map is described below in more detail with reference to FIG. 10A.

In some embodiments, occlusion detector 107 may determine one or more relative depth values of the one or more objects in the target object map. For example, the one or more relative depth values of the one or more objects can be determined based on one or more features of these objects. A feature of an object can be, for example, a size (e.g., indicated by an area) of the object, an average magnitude of a motion vector of the object, etc. The one or more relative depth values of the one or more objects can be used as a measurement to indicate which object is relatively closer to a camera. Specifically, a smaller relative depth value of an object indicates that the object is closer to the camera than another object with a larger relative depth value.

In some embodiments, an object with the largest area in target frame 204 can be identified as a background area (a background object) and assigned with the largest relative depth value. Any other object detected in target frame 204 can be assigned with a respective relative depth value that is smaller than that of the background object. For example, one or more other objects detected in target frame 204 can be assigned with an identical relative depth value which is smaller than that of the background object. In another example, one or more other objects detected in target frame 204 can be assigned with one or more different relative depth values which are smaller than that of the background object. When any other object overlaps with the background object, the other object can be determined to cover the background object.

Since each object can be assigned with a relative depth value, target blocks included in the same object are assigned with the relative depth value of the object. In other words, each target block included in the object may have the same relative depth value as the object. Thus, the target object map of target frame 204 can be used to indicate a corresponding relative depth value of each target block in target frame 204. That is, a corresponding relative depth value of each target block can be found from the target object map, which is useful for determining an occlusion detection result of the target block as described below in more detail.

In some embodiments, after the relative depth values of all objects in the target object map are determined, the interpolation of pixels in an occlusion area of target frame 204 may be handled accordingly. For example, when multiple objects overlap in an area of target frame 204, an object with the smallest depth value can be determined to cover all other objects that overlap with it. That is, only the pixels of the object with the smallest relative depth value may be used for interpolating the pixels of this occlusion area in target frame 204.

Occlusion detector 107 may be further configured to detect whether an occlusion scenario occurs in target frame 204 based at least in part on the set of motion vectors and the target object map of target frame 204. Responsive to detecting that an occlusion scenario occurs, occlusion detector 107 may detect an occlusion area in target frame 204, as described below in more detail.

In some embodiments, target frame 204 may include a non-occluded area, an occlusion area, or both. The non-occluded area can be an image area in target frame 204 that includes one or more non-occluded target blocks. The occlusion area can be an image area in target frame 204 that includes one or more occluded target blocks. The occlusion area may include one or more of a covered occlusion area, an uncovered occlusion area, and a combined occlusion area. The covered occlusion area may include one or more occluded target blocks having a covered occlusion status. The uncovered occlusion area may include one or more occluded target blocks having an uncovered occlusion status. The combined occlusion area may include one or more occluded target blocks having a combined occlusion status. The combined occlusion status can be a combination of the covered occlusion status and the uncovered occlusion status (e.g., a "covered-and-uncovered" status). The detection of the non-occluded area, the covered occlusion area, the uncovered occlusion area, or the combined occlusion area in target frame 204 is described below in more detail.

In some embodiments, occlusion detector 107 may perform an object projection process to project the target object map onto the plurality of reference frames 202 based on the set of motion vectors of target frame 204 and generate a plurality of reference object maps for the plurality of reference frames 202 thereof.

For example, for each reference frame 202, occlusion detector 107 may project each object of target frame 204 onto the reference frame 202 to generate an object projection on the reference frame 202. Specifically, occlusion detector 107 may project each target block of the object onto reference frame 202 to generate a block projection of the target block based on a motion vector of the target block relative to reference frame 202. Then, block projections of all target blocks of the object may be generated and aggregated to form the object projection for the object. By performing similar operations to project each object identified in the target object map onto reference frame 202, occlusion detector 107 may generate one or more object projections for the one or more objects on reference frame 202.

For an image area of reference frame 202 that is only covered by an object projection, occlusion detector 107 may determine that the image area of reference frame 202 is covered by an object associated with the object projection. As a result, the object is identified in a reference object map of reference frame 202. Each reference block in the image area may have the same relative depth value as the object.

Alternatively or additionally, for an image area of reference frame 202 where two or more object projections overlap, an object projection associated with an object with a smaller (or smallest) relative depth value is selected. For example, the two or more object projections are associated with two or more objects, respectively. Occlusion detector 107 may determine a set of relative depth values associated with the two or more objects from the target object map and a minimal relative depth value among the set of relative depth values. Occlusion detector 107 may identify, from the two or more object projections, an object projection associated with an object having the minimal relative depth value. The object with the smaller (or smallest) relative depth value can be equivalent to the object having the minimal relative depth value from the two or more objects.

Occlusion detector 107 may determine that the image area of reference frame 202 is covered by the object with the smaller (or smallest) relative depth value. As a result, the object with the smaller (or smallest) relative depth value can be identified in the reference object map of reference frame 202. Each reference block in the image area may have the same relative depth value as the object in the reference object map. The generation of an exemplary reference object map is also described below in more detail with reference to FIGS. 10B-10D.

In another example, for each reference frame 202, occlusion detector 107 may project the plurality of target blocks onto reference frame 202 to generate a plurality of block projections based on motion vectors of the plurality of target blocks relative to reference frame 202, respectively. That is, occlusion detector 107 may project each target block onto reference frame 202 to generate a block projection based on a motion vector of the target block relative to reference frame 202. Occlusion detector 107 may combine the plurality of block projections to generate a reference object map for reference frame 202 based at least in part on the target object map. Specifically, for a reference block of reference frame 202 that is only covered by a block projection of a target block, occlusion detector 107 may determine that the reference block is covered by an object associated with the target block. As a result, the object associated with the target block is identified in the reference object map of reference frame 202. The reference block may have the same relative depth value as the object.

Alternatively or additionally, for a reference block of reference frame 202 where two or more block projections of two or more target blocks overlap, a block projection associated with a target block having a smaller (or smallest) relative depth value is selected. For example, the two or more block projections are associated with the two or more target blocks, respectively. Occlusion detector 107 may determine a set of relative depth values associated with the two or more target blocks from the target object map and a minimal relative depth value among the set of relative depth values. Occlusion detector 107 may identify, from the two or more block projections, a block projection associated with a target block having the minimal relative depth value. The target block with the smaller (or smallest) relative depth value can be equivalent to the target block having the minimal relative depth value from the two or more target blocks.

Occlusion detector 107 may determine that the reference block is covered by an object associated with the target block having the smaller (or smallest) relative depth value. As a result, the object associated with the target block having the smaller (or smallest) relative depth value is identified in the reference object map of reference frame 202. The reference block may have the same relative depth value as the target block having the smaller (or smallest) relative depth value.

As a result, the reference object map for reference frame 202 can be generated. The plurality of reference blocks in reference frame 202 can be determined to be associated with one or more objects identified in the reference object map, respectively. It is noted that the objects identified in the reference object map may or may not be identical to the objects identified in the target object maps. For example, some objects identified in the target object map may not be present in the reference object map. In another example, all objects identified in the target object map may be present in the reference object map. Since each object identified in the reference object map can be associated with a relative depth value, reference blocks included in the same object can be associated with the same relative depth value of the object. Thus, the reference object map can be used to indicate a corresponding relative depth value of each reference block in reference frame 202. For example, a corresponding relative depth value of each reference block can be found from the reference object map, which is useful for determining occlusion detection results of target blocks as described below in more detail.

In some embodiments, occlusion detector 107 may detect an occlusion area in target frame 204 based on the set of motion vectors, the target object map, and the plurality of reference object maps for the plurality of reference frames 202. For example, occlusion detector 107 may detect a set of occluded target blocks from a plurality of target blocks in target frame 204 and generate an occlusion area for target frame 204 including the set of occluded target blocks.

In some implementations, the plurality of reference frames 202 may include a first previous frame preceding target frame 204 and a first next frame subsequent to target frame 204, and the plurality of reference object maps for the plurality of reference frames 202 may include a first previous object map for the first previous frame and a first next object map for the first next frame. For each target block in target frame 204, occlusion detector 107 may determine a first occlusion detection result for the target block. The first occlusion detection result may indicate whether the target block is an occluded target block relative to the first previous and next frames.

For example, occlusion detector 107 may determine, based on a motion vector of the target block relative to the first previous frame, a first previous block of the first previous frame that corresponds to the target block. Occlusion detector 107 may determine a relative depth value of the first previous block based on the first previous object map. Next, occlusion detector 107 may determine, based on a motion vector of the target block relative to the first next frame, a first next block of the first next frame that corresponds to the target block. Occlusion detector 107 may determine a relative depth value of the first next block based on the first next object map. Then, occlusion detector 107 may determine the first occlusion detection result for the target block based on a relative depth value of the target block, the relative depth value of the first previous block, and the relative depth value of the first next block.

If the relative depth value of the target block is not greater than the relative depth value of the first previous block and is greater than the relative depth value of the first next block (e.g., a covered occlusion condition is satisfied), occlusion detector 107 may determine that the target block is an occluded target block having a covered occlusion status relative to the first previous and next frames. For example, the target block may be a covered occlusion target block relative to the first previous and next frames, such that the target block is revealed in the first previous frame but covered by an object with a smaller relative depth value in the first next frame. A matched block of the target block can be the first previous block in the first previous frame.

If the relative depth value of the target block is greater than the relative depth value of the first previous block and not greater than the relative depth value of the first next block (e.g., an uncovered occlusion condition is satisfied), occlusion detector 107 may determine that the target block is an occluded target block having an uncovered occlusion status relative to the first previous and next frames. For example, the target block may be an uncovered occlusion target block relative to the first previous and next frames, such that the target block is covered by an object with a smaller relative depth value in the first previous frame but revealed in the first next frame. A matched block of the target block can be the first next block in the first next frame.

If the relative depth value of the target block is greater than the relative depth value of the first previous block and also greater than the relative depth value of the first next block (e.g., a combined occlusion condition is satisfied), occlusion detector 107 may determine that the target block is an occluded target block having a combined occlusion status relative to the first previous and next frames. For example, the target block may be a combined occlusion target block relative to the first previous and next frames, such that the target block is covered by a first object in the first previous frame and a second object in the first next frame. Each of the first and second objects may have a relative depth value smaller than that of the target block. The first and second objects can be the same object or different objects. No matched block can be found for the target block from the first previous frame and the first next frame.

Otherwise (e.g., none of the covered occlusion condition, the uncovered occlusion condition, and the combined occlusion condition is satisfied), occlusion detector 107 may determine that the target block is a non-occluded target block. For example, the target block is revealed in the first previous and next frames. Matched blocks of the target block may include the first previous block in the first previous frame and the first next block in the first next frame.

In other words, occlusion detector 107 may determine whether the target block is a non-occluded target block, a covered occlusion target block, an uncovered occlusion target block, or a combined occlusion target block based on the following expression (1):

$$\text{occlusion}(k, P1, N1) = \begin{cases} \text{covered} & \text{if } D_k \le D_{R(k,P1)} \text{ and } D_k > D_{R(k,N1)} \\ \text{uncovered} & \text{if } D_k > D_{R(k,P1)} \text{ and } D_k \le D_{R(k,N1)} \\ \text{combined} & \text{if } D_k > D_{R(k,P1)} \text{ and } D_k > D_{R(k,N1)} \\ \text{non-occluded} & \text{otherwise} \end{cases} \quad (1)$$

In the above expression (1), k denotes an index of the target block, occlusion(k, P1, N1) denotes a first occlusion detection result of the target block k relative to the first previous frame P1 and the first next frame N1, $D_k$ denotes a relative depth value of the target block k, $D_{R(k, P1)}$ denotes a relative depth value of a first previous block R(k, P1) corresponding to the target block k from the first previous frame P1, and $D_{R(k, N1)}$ denotes a relative depth value of a first next block R(k, N1) corresponding to the target block k from the first next frame N1. The first previous block R(k, P1) can be determined by projecting the target block k to the first previous frame P1 based on a motion vector of the target block k relative to the first previous frame P1. The first next block R(k, N1) can be determined by projecting the target block k to the first next frame N1 based on a motion vector of the target block k relative to the first next frame N1.

In the above expression (1), a "covered" result represents that the target block k is a covered occlusion target block, and a matched block of the target block k can be found in the first previous frame P1, which is the first previous block R(k, P1). An "uncovered" result represents that the target block k is an uncovered occlusion target block, and a matched block of the target block k can be found in the first next frame N1, which is the first next block R(k, N1). A "combined" result represents that the target block k is a combined occlusion target block, and no matched block of the target block k can be found in the first previous frame P1 and the first next frame N1. A "non-occluded" result represents that the target block k is a non-occluded target block, and two matched blocks of the target block k can be found in the first previous frame P1 and the first next frame N1, respectively, which include the first previous block R(k, P1) and the first next block R(k, N1).

Based on the above expression (1), the relative depth values of the target block k and its corresponding reference blocks R(k, P1) and R(k, N1) can be compared to determine whether the target block k is occluded in the corresponding reference frames N1 and P1. The "covered," "uncovered," "combined," or "non-occluded" result can then be determined based on whether the target block k is occluded when projected onto the reference frames N1 and P1.

By performing similar operations for each target block in target frame 204, occlusion detector 107 may determine a plurality of first occlusion detection results for the plurality of target blocks. Based on the plurality of first occlusion detection results, occlusion detector 107 may determine one or more non-occluded target blocks, one or more covered occlusion target blocks, one or more uncovered occlusion target blocks, and/or one or more combined occlusion target blocks relative to the first previous and next frames from the plurality of target blocks. Then, occlusion detector 107 may determine a non-occluded area including the one or more non-occluded target blocks, a covered occlusion area including the one or more covered occlusion target blocks, an uncovered occlusion area including the one or more uncovered occlusion target blocks, and/or a combined occlusion area including the one or more combined occlusion target blocks.

In some implementations, the plurality of reference frames 202 may further include a second previous frame preceding the first previous frame and a second next frame subsequent to the first next frame. The plurality of reference object maps may further include a second previous object map for the second previous frame and a second next object map for the second next frame. To further improve an interpolation result of the combined occlusion area of target frame 204, occlusion detector 107 may determine a second occlusion detection result for each target block in the combined occlusion area. The second occlusion detection result may indicate whether the target block is an occluded target block relative to the second previous frame and the second next frame.

Specifically, for each target block in the combined occlusion area which is identified as a combined occlusion target block relative to the first previous and next frames (e.g., no matched block found from the first previous and next frames), occlusion detector 107 may further determine whether the target block has any matched block from more reference frames (e.g., besides the first previous and next frames). By using more reference frames, a FRUC result of the video data can be improved. For example, for each target block in the combined occlusion area, occlusion detector 107 may determine whether the target block is a non-occluded target block, a covered occlusion target block, an uncovered occlusion target block, or a combined occlusion target block relative to the second previous and next frames based on the following expression (2):

$$\text{occlusion}(k, P2, N2) = \begin{cases} \text{covered} & \text{if } D_k \le D_{R(k,P2)} \text{ and } D_k > D_{R(k,N2)} \\ \text{uncovered} & \text{if } D_k > D_{R(k,P2)} \text{ and } D_k \le D_{R(k,N2)} \\ \text{combined} & \text{if } D_k > D_{R(k,P2)} \text{ and } D_k > D_{R(k,N2)} \\ \text{non-occluded} & \text{otherwise} \end{cases} \quad (2)$$

In the above expression (2), k denotes an index of the target block, occlusion(k, P2, N2) denotes the second occlusion detection result of the target block k relative to the second previous frame P2 and the second next frame N2, $D_{R(k,p2)}$ denotes a relative depth value of a second previous block R(k, P2) corresponding to the target block k from the second previous frame P2, and $D_{R(k,N2)}$ denotes a relative depth value of a second next block R(k, N2) corresponding to the target block k from the second next frame N2. The second previous block R(k, P2) can be determined by projecting the target block k to the second previous frame P2 based on a motion vector of the target block k relative to the second previous frame P2. The second next block R(k, N2) can be determined by projecting the target block k to the second next frame N2 based on a motion vector of the target block k relative to the second next frame N2.

In the above expression (2), a "covered" result represents that the target block k is a covered occlusion target block, and a matched block of the target block k can be found in the second previous frame P2, which is the second previous block R(k, P2). An "uncovered" result represents that the target block k is an uncovered occlusion target block, and a matched block of the target block k can be found in the second next frame N2, which is the second next block R(k, N2). A "combined" result represents that the target block k is a combined occlusion target block, and no matched block of the target block k can be found in the second previous frame P2 and the second next frame N2. A "non-occluded" result represents that the target block k is a non-occluded target block, and two matched blocks of the target block k can be found in the second previous frame P2 and the second next frame N2, respectively, which include the second previous block R(k, P2) and the second next block R(k, N2).

As a result, occlusion detector 107 may determine one or more second occlusion detection results for the one or more target blocks included in the combined occlusion area. Based on the one or more second occlusion detection results, occlusion detector 107 may determine one or more non-occluded target blocks, one or more covered occlusion target blocks, one or more uncovered occlusion target blocks, and/or one or more combined occlusion target blocks relative to the second previous and next frames from the one or more target blocks in the combined occlusion area.

Then, occlusion detector 107 may update the non-occluded area to further include the one or more non-occluded target blocks relative to the second previous and next frames. Alternatively or additionally, occlusion detector 107 may update the covered occlusion area to further include the one or more covered occlusion target blocks relative to the second previous and next frames. Alternatively or additionally, occlusion detector 107 may update the uncovered occlusion area to further include the one or more uncovered occlusion target blocks relative to the second previous and next frames.

Alternatively or additionally, occlusion detector 107 may also update the combined occlusion area to only include the one or more combined occlusion target blocks relative to the second previous and next frames. That is, the one or more non-occluded target blocks, the one or more covered occlusion target blocks, and/or the one or more uncovered occlusion target blocks relative to the second previous and next frames can be removed from the combined occlusion area, because matched blocks for these target blocks can be found either from the second previous frame or the second next frame, or from both of the second previous and next frames. The updated combined occlusion area only includes one or more target blocks having a combined occlusion status relative to the first previous and next frames as well as the second previous and next frames.

Furthermore, for each target block remaining in the combined occlusion area, occlusion detector 107 may further determine a third (or, a fourth, a fifth, . . . ) occlusion detection result for the target block relative to a third (or, a fourth, a fifth, . . . ) previous frame preceding the second previous frame and a third (or, a fourth, a fifth, . . . ) next frame subsequent to the second next frame. The descriptions of determining the further occlusion detection results are similar to those for describing the first and second occlusion detection results and thus will not be repeated herein. By using more reference frames, an occlusion detection of target frame 204 can be improved.

Consistent with the disclosure herein, the above expression (1) or (2) can be extended and generalized to determine an occlusion detection result for the target block k using different reference frames in a flexible manner. For example, occlusion detector 107 may determine whether the target block k is a non-occluded target block, a covered occlusion target block, an uncovered occlusion target block, or a combined occlusion target block relative to an $i^{th}$ previous frame Pi and a $j^{th}$ next frame Nj based on the following expression (3):

$$\text{occlusion}(k, Pi, Nj) = \begin{cases} \text{covered} & \text{if } D_k \le D_{R(k,Pi)} \text{ and } D_k > D_{R(k,Nj)} \\ \text{uncovered} & \text{if } D_k > D_{R(k,Pi)} \text{ and } D_k \le D_{R(k,Nj)} \\ \text{combined} & \text{if } D_k > D_{R(k,Pi)} \text{ and } D_k > D_{R(k,Nj)} \\ \text{non}-\text{occluded} & \text{otherwise} \end{cases} \quad (3)$$

In the above expression (3), occlusion(k, Pi, Nj) denotes an occlusion detection result of the target block k relative to the $i^{th}$ previous frame Pi and the $j^{th}$ next frame Nj, where i and j are positive integers. $D_{R(k,Pi)}$ denotes a relative depth value of an $i^{th}$ previous block R(k, Pi) corresponding to the target block k from the $i^{th}$ previous frame Pi. $D_{R(k,Nj)}$ denotes a relative depth value of $j^{th}$ next block R(k, Nj) corresponding to the target block k from the $j^{th}$ next frame Nj. The $i^{th}$ previous block R(k, Pi) can be determined by projecting the target block k to the $i^{th}$ previous frame Pi based on a motion vector of the target block k relative to the $i^{th}$ previous frame Pi. The $j^{th}$ next block R(k, Nj) can be determined by projecting the target block k to the $j^{th}$ next frame Nj based on a motion vector of the target block k relative to the $j^{th}$ next frame Nj.

In the above expression (3), a "covered" result represents that the target block k is a covered occlusion target block, and a matched block of the target block k can be found in the $i^{th}$ previous frame Pi, which is the $i^{th}$ previous block R(k, Pi). An "uncovered" result represents that the target block k is an uncovered occlusion target block, and a matched block of the target block k can be found in the $j^{th}$ next frame Nj, which is the $j^{th}$ next block R(k, Nj). A "combined" result represents that the target block k is a combined occlusion target block, and no matched block of the target block k can be found in the $i^{th}$ previous frame Pi and the $j^{th}$ next frame Nj. A "non-occluded" result represents that the target block k is a non-occluded target block, and two matched blocks of the target block k can be found in the $i^{th}$ previous frame Pi and the $j^{th}$ next frame Nj, respectively, which include the $i^{th}$ previous block R(k, Pi) and the $j^{th}$ next block R(k, Nj).

Motion compensation module 109 may be configured to receive the set of motion vectors of target frame 204 from motion estimation module 105 and the occlusion area detected for target frame 204 from occlusion detector 107. Motion compensation module 109 may generate image content of target frame 204 from the plurality of reference frames 202 based on the set of motion vectors and the occlusion area of target frame 204.

In some embodiments, target frame 204 may include a non-occluded area. For each target block in the non-occluded area, motion compensation module 109 may project the target block to the plurality of reference frames 202 to determine matched blocks from the plurality of reference frames 202 based on motion vectors of the target block relative to the plurality of reference frames 202, respectively. If the motion vectors have sub-pixel precision, an interpolation filtering process may be used to generate the matched blocks. Then, motion compensation module 109 may generate image content of the target block through a weighted average operation on image content of the matched blocks. For example, a pixel of the target block at a particular pixel location can be equal to a weighted average of pixels of the matched blocks at the same pixel location.

For example, referring to FIG. 2B, assuming that target block 212 is a non-occluded target block relative to first previous frame 202*a* and first next frame 202*b*. Motion compensation module 109 may project target block 212 to first previous frame 202*a* to obtain a matched block 214 based on motion vector 222, and project target block 212 to first next frame 202*b* to obtain a matched block 218 based on motion vector 224. Motion compensation module 109 may generate image content of target block 212 through a weighted average operation on image content of matched block 214 and image content of matched block 218.

In another example, assuming that target block 212 is a combined occlusion target block relative to first previous frame 202*a* and first next frame 202*b* and a non-occluded target block relative to second previous frame 202*c* and second next frame 202*d*. Motion compensation module 109 may project target block 212 to second previous frame 202*c* to obtain a matched block 216 based on motion vector 226, and project target block 212 to second next frame 202*d* to obtain a matched block 220 based on motion vector 228. Motion compensation module 109 may generate image content of target block 212 through a weighted average operation on image content of matched blocks 216 and 220.

In yet another example, assuming that target block 212 is a non-occluded target block relative to first previous frame 202*a* and first next frame 202*b* as well as second previous frame 202*c* and second next frame 202*d*. Motion compensation module 109 may generate image content of target block 212 through a weighted average operation on image content of matched blocks 214, 216, 218, and 220.

In some embodiments, target frame 204 may include a covered occlusion area. For each target block in the covered occlusion area, motion compensation module 109 may project the target block to one or more previous frames to determine one or more matched blocks for the target block from the one or more previous frames based on one or more motion vectors of the target block relative to the one or more previous frames. Motion compensation module 109 may generate image content of the target block through a weighted average operation on image content of the one or more matched blocks.

For example, referring to FIG. 2B, assuming that target block 212 is a covered occlusion target block relative to first previous frame 202*a* and first next frame 202*b*. Motion compensation module 109 may project target block 212 to first previous frame 202*a* to obtain matched block 214 based on motion vector 222. Motion compensation module 109 may generate image content of target block 212 based on image content of matched block 214 (e.g., the image content of the target block can be identical to the image content of the matched block).

In another example, assuming that target block 212 is a combined occlusion target block relative to first previous frame 202*a* and first next frame 202*b* and a covered occlusion target block relative to second previous frame 202*c* and second next frame 202*d*. Motion compensation module 109 may project target block 212 to second previous frame 202*c* to obtain matched block 216 based on motion vector 226. Motion compensation module 109 may generate image content of target block 212 based on image content of matched block 216.

In yet another example, assuming that target block 212 is a covered occlusion target block relative to first previous frame 202*a* and first next frame 202*b* as well as second previous frame 202*c* and second next frame 202*d*. Motion compensation module 109 may project target block 212 to first previous frame 202*a* and second previous frame 202*c* to obtain matched blocks 214 and 216 based on motion vectors 222 and 226, respectively. Motion compensation module 109 may generate image content of target block 212 through a weighted average operation on image content of matched blocks 214 and 216.

In some embodiments, target frame 204 may include an uncovered occlusion area. For each target block in the uncovered occlusion area, motion compensation module 109 may project the target block to one or more next frames to determine one or more matched blocks for the target block from the one or more next frames based on motion vectors of the target block relative to the one or more next frames, respectively. Then, motion compensation module 109 may generate image content of the target block through a weighted average operation on image content of the one or more matched blocks.

For example, referring to FIG. 2B, assuming that target block 212 is an uncovered target block relative to first previous frame 202a and first next frame 202b. Motion compensation module 109 may project target block 212 to first next frame 202b to obtain matched block 218 based on motion vector 224. Motion compensation module 109 may generate image content of target block 212 based on image content of matched block 218.

In another example, assuming that target block 212 is a combined occlusion target block relative to first previous frame 202a and first next frame 202b and an uncovered occlusion target block relative to second previous frame 202c and second next frame 202d. Motion compensation module 109 may project target block 212 to second next frame 202d to obtain matched block 220 based on motion vector 228. Motion compensation module 109 may generate image content of target block 212 based on image content of matched block 220.

In yet another example, assuming target block 212 is an uncovered occlusion target block relative to first previous frame 202a and first next frame 202b as well as second previous frame 202c and second next frame 202d. Motion compensation module 109 may generate image content of target block 212 through a weighted average operation on image content of matched blocks 218 and 220.

In some embodiments, target frame 204 may include a combined occlusion area. For each target block in the combined occlusion area, no matched blocks can be found for the target block from the plurality of reference frames 202. In this case, additional processing may be needed for interpolation of pixels in the target block. For example, a hole filling method such as spatial interpolation (e.g., image inpainting) may be used to fill the pixels in the target block. In another example, the target block can be generated from copying a collocated block in either the first previous frame or the first next frame. The collocated block can be obtained by projecting the target block to the first previous frame or the first next frame using a zero motion vector. In yet another example, the target block can be derived by a weighted average of collocated blocks from both the first previous frame and the first next frame.

Alternatively, for each target block in the combined occlusion area, additional reference frames can be introduced into the plurality of reference frames 202 so that operations similar to those described above with reference to occlusion detector 107 and motion compensation module 109 can be performed to search for one or more matched blocks from the additional reference frames. The similar description is not repeated here. Then, if one or more matched blocks can be found for the target block from the additional reference frames, image content of the target block can be generated based on the image content of the one or more matched blocks.

Figure 3:
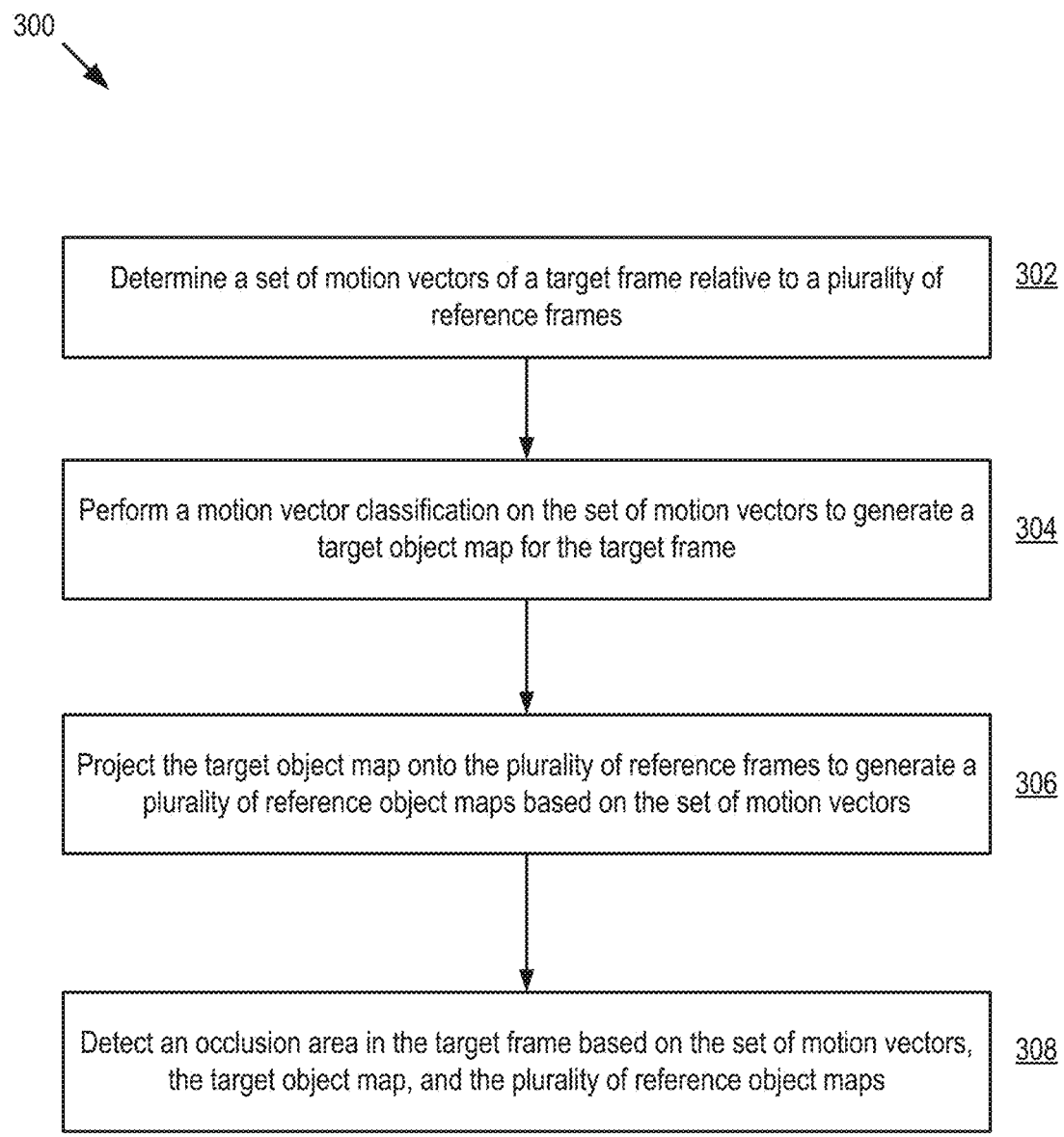
FIG. 3 is a flow chart of an exemplary method for performing FRUC of video data, according to embodiments of the disclosure.

FIG. 3 is a flow chart of an exemplary method 300 of performing FRUC of video data, according to embodiments of the disclosure. Method 300 may be implemented by system 101, specifically motion estimation module 105 and occlusion detector 107, and may include steps 302-308 as described below. Some of the steps may be optional to perform the disclosure provided herein. Further, some of the steps may be performed simultaneously, or in a different order than shown in FIG. 3.

In step 302, motion estimation module 105 determines a set of motion vectors of a target frame relative to a plurality of reference frames. For example, the target frame can be divided into a plurality of target blocks. For each target block in the target frame, motion estimation module 105 determines a plurality of motion vectors of the target block relative to the plurality of reference frames, respectively. In another example, motion estimation module 105 may perform operations similar to those described below with reference to FIG. 4 to determine the set of motion vectors.

In step 304, occlusion detector 107 performs a motion vector classification on the set of motion vectors to generate a target object map for the target frame. For example, occlusion detector 107 may perform operations similar to those described below with reference to FIG. 5 to generate the target object map.

In step 306, occlusion detector 107 projects the target object map onto the plurality of reference frames to generate a plurality of reference object maps based on the set of motion vectors. For example, for each reference frame, occlusion detector 107 projects the plurality of target blocks onto the reference frame to generate a plurality of block projections based on motion vectors of the plurality of target blocks relative to the reference frame, respectively. Occlusion detector 107 combines the plurality of block projections to generate a reference object map for the reference frame. Occlusion detector 107 determines one or more relative depth values of one or more objects identified in the reference object map. As a result, occlusion detector 107 can generate a plurality of reference object maps for the plurality of reference frames, respectively.

In step 308, occlusion detector 107 detects an occlusion area in the target frame based on the set of motion vectors, the target object map, and the plurality of reference object maps. For example, occlusion detector 107 may perform operations similar to those described below with reference to FIGS. 6A-6B to determine one or more occlusion detection results for each target block. Occlusion detector 107 may determine the occlusion area in the target frame based on occlusion detection results of the plurality of target blocks in the target frame.

Figure 4:
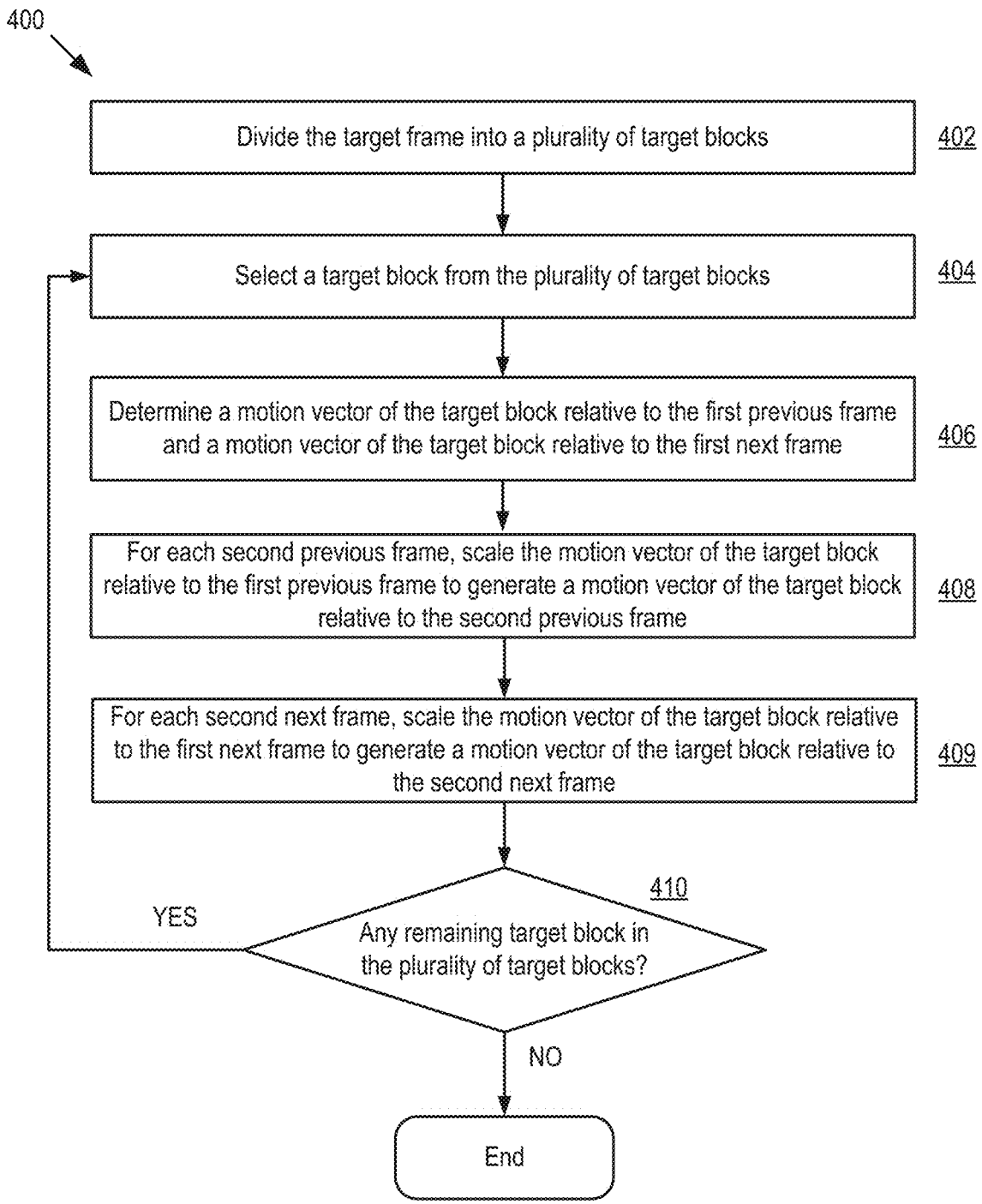
FIG. 4 is a flow chart of an exemplary method for determining a set of motion vectors for a target frame relative to a plurality of reference frames, according to embodiments of the disclosure.

FIG. 4 is a flow chart of an exemplary method 400 for determining a set of motion vectors for a target frame relative to a plurality of reference frames, according to embodiments of the disclosure. Method 400 may be implemented by system 101, specifically motion estimation module 105, and may include steps 402-410 as described below. Some of the steps may be optional to perform the disclosure provided herein. Further, some of the steps may be performed simultaneously, or in a different order than shown in FIG. 4.

In some embodiments, the plurality of reference frames may include a first previous frame preceding the target frame, one or more second previous frames preceding the first previous frame, a first next frame following the target frame, and one or more second next frames following the first next frame.

In step 402, motion estimation module 105 divides the target frame into a plurality of target blocks.

In step 404, motion estimation module 105 selects a target block to be processed from the plurality of target blocks.

In step 406, motion estimation module 105 determines a motion vector of the target block relative to the first previous frame and a motion vector of the target block relative to the first next frame. For example, motion estimation module 105 may utilize a bilateral-matching motion estimation technique, a forward motion estimation technique, or a backward motion estimation technique described below with reference to FIGS. 7-8B to determine motion vectors of the target block relative to the first previous and next frames.

In step 408, for each second previous frame, motion estimation module 105 scales the motion vector of the target block relative to the first previous frame to generate a motion vector of the target block relative to the second previous frame.

In step 409, for each second next frame, motion estimation module 105 scales the motion vector of the target block relative to the first next frame to generate a motion vector of the target block relative to the second next frame.

In step 410, motion estimation module 105 determines whether there is any remaining target block in the plurality of target blocks to be processed. Responsive to there being at least one remaining target block to be processed, method 400 may return to step 404 to select a remaining target block so that the selected target block can be processed. Otherwise, since all the target blocks in the target frame are processed, method 400 ends.

Figure 5:
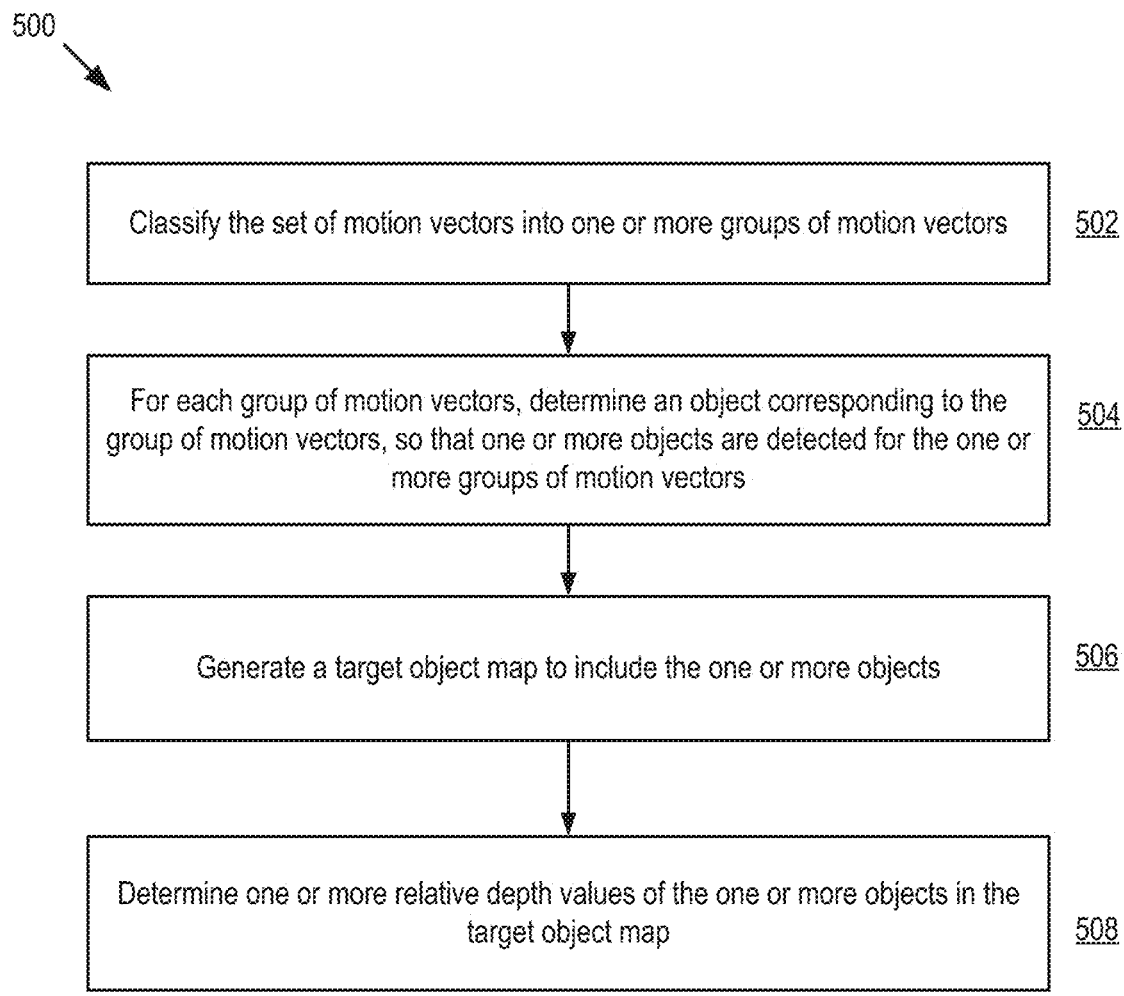
FIG. 5 is a flow chart of an exemplary method for generating a target object map for a target frame, according to embodiments of the disclosure.

FIG. 5 is a flow chart of an exemplary method 500 for generating a target object map for a target frame, according to embodiments of the disclosure. Method 500 may be implemented by system 101, specifically occlusion detector 107, and may include steps 502-508 as described below. Some of the steps may be optional to perform the disclosure provided herein. Further, some of the steps may be performed simultaneously, or in a different order than shown in FIG. 5.

In step 502, occlusion detector 107 classifies a set of motion vectors of the target frame into one or more groups of motion vectors.

In step 504, for each group of motion vectors, occlusion detector 107 determines an object corresponding to the group of motion vectors. As a result, occlusion detector 107 determines one or more objects for the one or more groups of motion vectors, respectively.

In step 506, occlusion detector 107 generates a target object map to include the one or more objects.

In step 508, occlusion detector 107 determines one or more relative depth values of the one or more objects in the target object map.

Figure 6A:
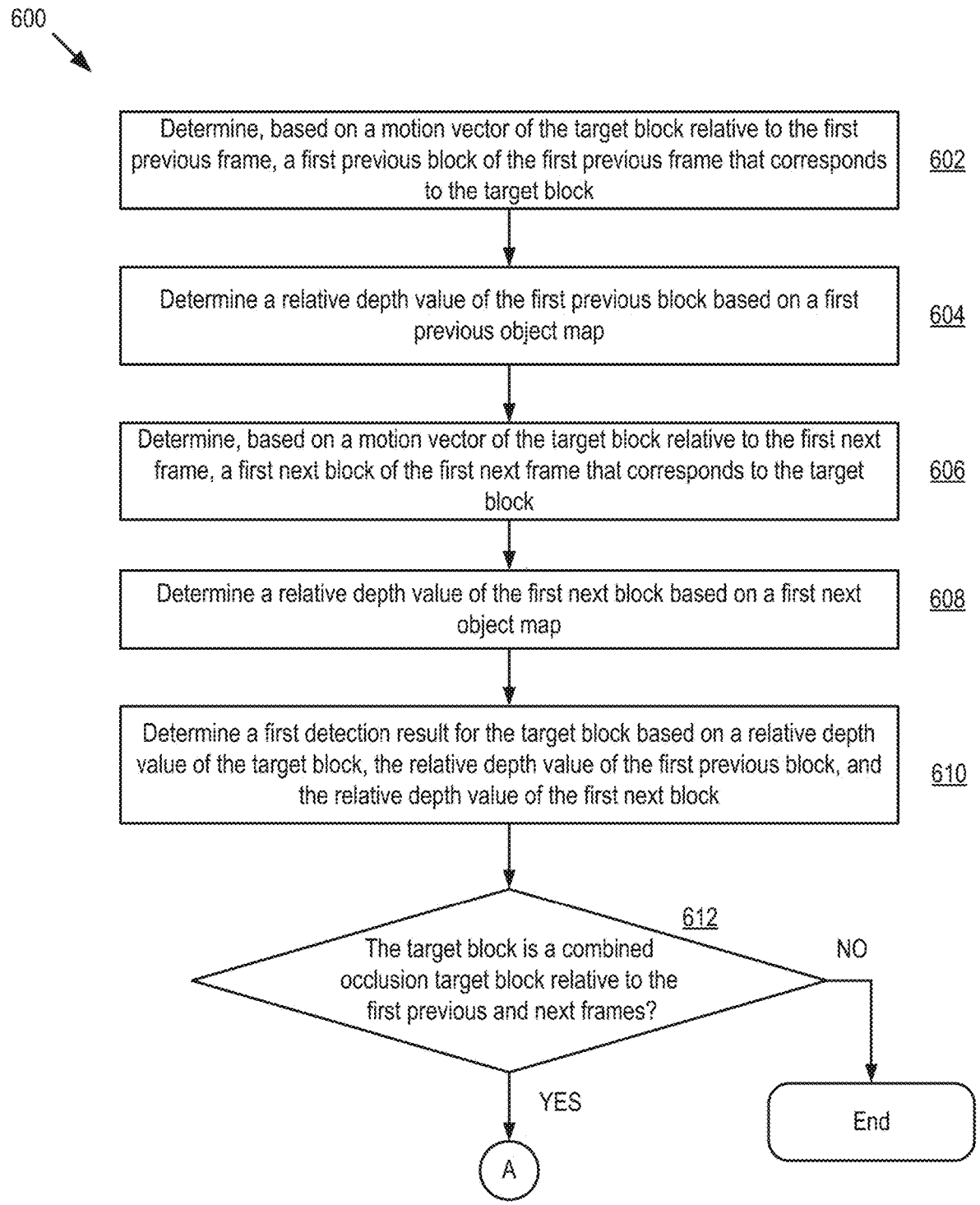
FIGS. 6A-6B are flow charts of an exemplary method for performing an occlusion detection on a target block, according to embodiments of the disclosure.
Figure 6B:
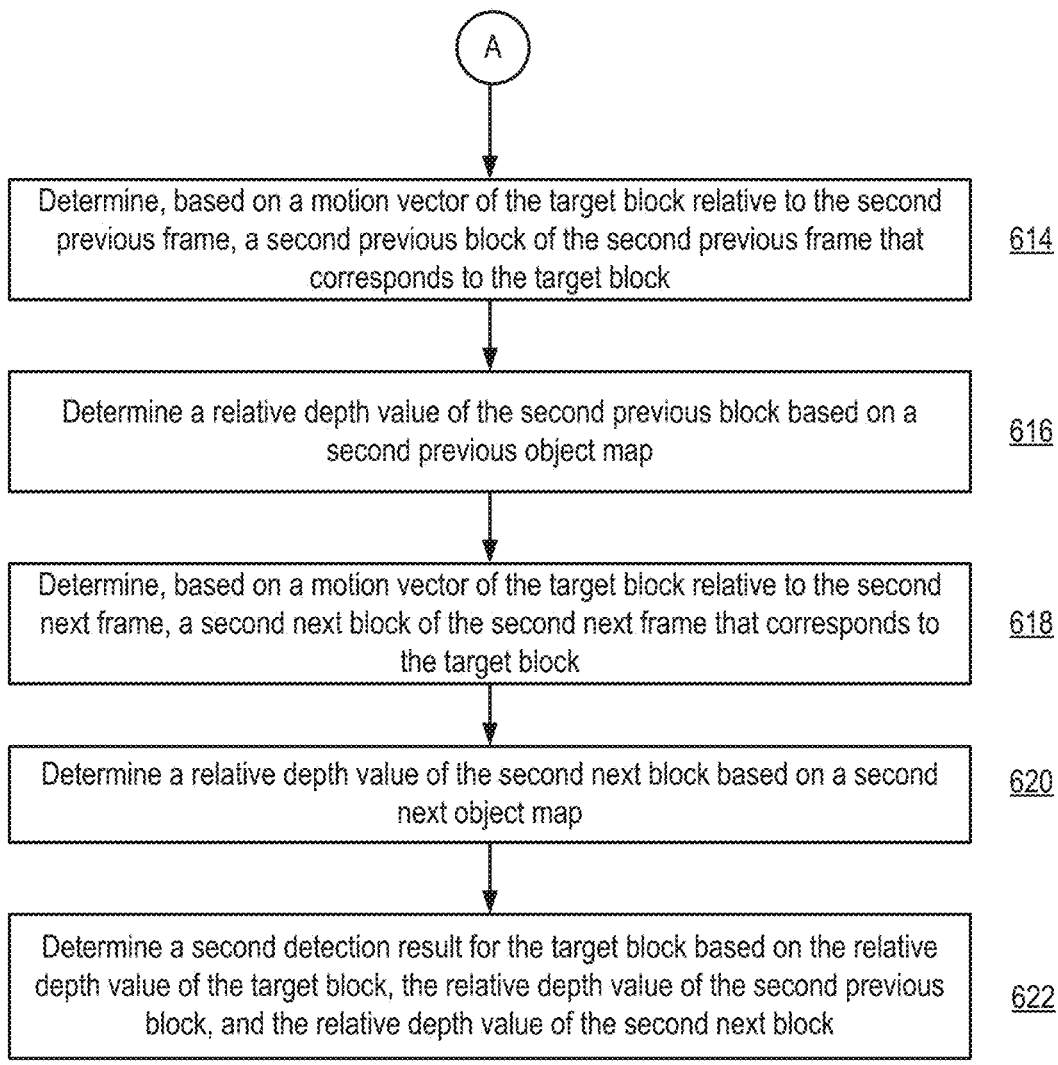

FIGS. 6A-6B are flow charts of an exemplary method 600 for performing an occlusion detection on a target block, according to embodiments of the disclosure. Method 600 may be implemented by system 101, specifically occlusion detector 107, and may include steps 602-622 as described below. Some of the steps may be optional to perform the disclosure provided herein. Further, some of the steps may be performed simultaneously, or in a different order than shown in FIGS. 6A-6B.

In some embodiments, the plurality of reference frames used herein may include multiple previous reference frames, e.g., including a first previous frame preceding the target frame, a second previous frame preceding the first previous frame, a third previous frame preceding the second previous frame, etc. The plurality of reference frames may further include multiple next frames, e.g., including a first next frame following the target frame, a second next frame following the first next frame, a third next frame following the second next frame, etc.

Referring to FIG. 6A, in step 602, occlusion detector 107 determines, based on a motion vector of the target block relative to the first previous frame, a first previous block of the first previous frame that corresponds to the target block.

In step 604, occlusion detector 107 determines a relative depth value of the first previous block based on a first previous object map of the first previous frame.

In step 606, occlusion detector 107 determines, based on a motion vector of the target block relative to the first next frame, a first next block of the first next frame that corresponds to the target block.

In step 608, occlusion detector 107 determines a relative depth value of the first next block based on a first next object map of the first next frame.

In step 610, occlusion detector 107 determines a first occlusion detection result for the target block based on a relative depth value of the target block, the relative depth value of the first previous block, and the relative depth value of the first next block.

In step 612, occlusion detector 107 determines whether the target block is a combined occlusion target block relative to the first previous and next frames based on the first occlusion detection result. Responsive to the target block being a combined occlusion target block relative to the first previous and next frames, method 600 proceeds to step 614 of FIG. 6B. Otherwise (e.g., the target block being a non-occluded target block, a covered occlusion target block, or an uncovered occlusion target block relative to the first previous and next frames), method 600 ends.

Referring to FIG. 6B, in step 614, occlusion detector 107 determines, based on a motion vector of the target block relative to the second previous frame, a second previous block of the second previous frame that corresponds to the target block.

In step 616, occlusion detector 107 determines a relative depth value of the second previous block based on a second previous object map of the second previous frame.

In step 618, occlusion detector 107 determines, based on a motion vector of the target block relative to the second next frame, a second next block of the second next frame that corresponds to the target block.

In step 620, occlusion detector 107 determines a relative depth value of the second next block based on a second next object map of the second next frame.

In step 622, occlusion detector 107 determines a second occlusion detection result for the target block based on the relative depth value of the target block, the relative depth value of the second previous block, and the relative depth value of the second next block.

Additionally, occlusion detector 107 may determine whether the target block is still a combined occlusion target block relative to the second previous and next frames based on the second occlusion detection result. Responsive to the target block being a combined occlusion target block relative to the second previous and next frames, method 600 may proceed to determine a third occlusion detection result for the target block relative the third previous frame and the third next frame. The similar description will not be repeated here. Otherwise (e.g., the target block being a non-occluded target block, a covered occlusion target block, or an uncovered occlusion target block relative to the second previous and next frames), method 600 ends.

Figure 7:
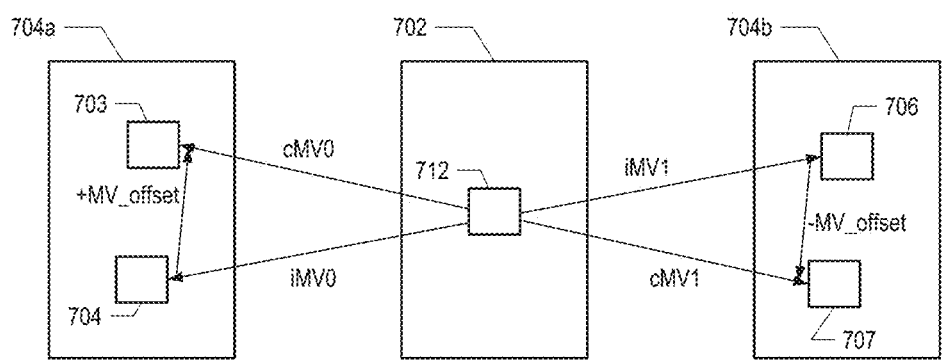
FIG. 7 is a graphical representation illustrating a bilateral-matching motion estimation process, according to embodiments of the disclosure.

FIG. 7 is a graphical representation illustrating a bilateral-matching motion estimation process 700, according to embodiments of the disclosure. In some embodiments, a block matching scheme as well as an optical flow scheme can be used to estimate motion vectors of a target frame, and the target frame can be interpolated along a motion trajectory of the motion vectors. The block matching scheme can be easily designed with low computational complexity. The block matching scheme may include a bilateral-matching motion estimation technique, a forward motion estimation technique, or a backward motion estimation technique, etc.

The bilateral-matching motion estimation technique disclosed herein may be performed for each target block in the target frame to obtain a motion vector of the target block relative to a previous frame and a motion vector of the target block relative to a next frame. In some embodiments, the previous and next frames can be two reference frames closest to the target frame. For example, the previous frame can be a reference frame immediately preceding the target frame with respect to a display order (or time order), and the next frame can be a reference frame immediately subsequent to the target frame with respect to the display order (or time order). In some other embodiments, the previous frame can be any reference frame preceding the target frame, and the next frame can be any reference frame subsequent to the target frame, which is not limited in the disclosure herein.

Referring to FIG. 7, motion estimation module 105 may use the bilateral-matching motion estimation technique to determine motion vectors of a target block 712 of a target frame 702 relative to a previous frame 704a and a next frame 704b. Specifically, motion estimation module 105 may perform a bilateral matching search process in previous frame 704a and next frame 704b to determine a set of candidate motion vectors for target block 712. The set of candidate motion vectors may include a first pair of candidate motion vectors and one or more second pairs of candidate motion vectors surrounding the first pair of candidate motion vectors. For example, the first pair of candidate motion vectors may include an initial candidate motion vector (iMV0) relative to previous frame 704a and an initial candidate motion vector (iMV1) relative to next frame 704b. An exemplary second pair of candidate motion vectors may include a candidate motion vector (cMV0) relative to previous frame 704a and a candidate motion vector (cMV1) relative to next frame 704b.

Candidate motion vectors in each pair can be symmetrical. For example, in the first pair, the initial candidate motion vector (iMV0) pointing to previous frame 704a can be an opposite of the initial candidate motion vector (iMV1) pointing to next frame 704b. In the second pair, the candidate motion vector (cMV0) pointing to previous frame 704a can be an opposite of the candidate motion vector (cMV1) pointing to next frame 704b. A difference between the initial candidate motion vector iMV0 and the candidate motion vector cMV0 can be referred to as a motion vector offset and denoted as MV_offset. For example, the following expressions (4)-(6) can be established for the bilateral-matching motion estimation technique:

$$cMV0=-cMV1, \quad (4)$$

$$cMV0=iMV0+MV\_offset, \quad (5)$$

$$cMV1=iMV1-MV\_offset. \quad (6)$$

For each pair of candidate motion vectors, two corresponding reference blocks (e.g., a corresponding previous block and a corresponding next block) can be located from previous frame 704a and next frame 704b, respectively. For example, for the first pair of candidate motion vectors (iMV0 and iMV1), a previous block 704 and a next block 706 can be located for target block 712 from previous frame 704a and next frame 704b, respectively. For the second pair of candidate motion vectors (cMV0 and cMV1), a previous block 703 and a next block 707 can be located for target block 712 from previous frame 704a and next frame 704b, respectively.

Next, for each pair of candidate motion vectors (iMV0 and iMV1, or cMV0 and cMV1), a distortion value (e.g., a sum of absolute difference (SAD) values) between the two corresponding reference blocks can be determined. Then, a pair of candidate motion vectors that has a lowest distortion value (e.g., a lowest SAD value) can be determined, and considered as motion vectors of target block 712 relative to previous frame 704a and next frame 704b.

It is noted that a distortion metric is used herein when determining motion vectors of target block 712 relative to previous and next frames 704a and 704b, so that the determined motion vectors can have the best match between two corresponding reference blocks in previous and next frames 704a and 704b. Examples of the distortion metric used herein may include, but are not limited to, the following: a SAD metric, a mean square error (MSE) metric, or a mean absolute distortion (MAD) metric.

Figure 8A:
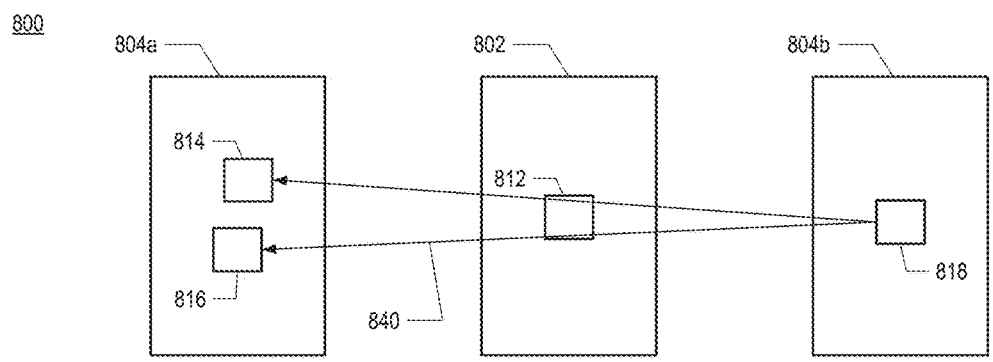
FIG. 8A is a graphical representation illustrating a forward motion estimation process, according to embodiments of the disclosure.

FIG. 8A is a graphical representation illustrating a forward motion estimation process 800, according to embodiments of the disclosure. FIG. 8B is a graphical representation illustrating a backward motion estimation process 850, according to embodiments of the disclosure. Either the forward motion estimation technique or the backward motion estimation technique disclosed herein may be performed for each target block in a target frame to obtain a motion vector of the target block relative to a previous frame and a motion vector of the target block relative to a next frame. In each of the forward and backward motion estimation techniques, different reference blocks are searched only in one of the two reference frames (e.g., either the previous frame or the next frame), while a fixed reference block is used in the other one of the two reference frames.

In some embodiments, in the forward motion estimation technique shown in FIG. 8A, a next block 818 of a next frame 804b that is collocated with a target block 812 of a target frame 802 is used as a fixed corresponding reference block for target block 812, while different previous blocks (e.g., including previous blocks 814, 816) in a previous frame 804a are selected as corresponding reference blocks for target block 812. A distortion value between next block 818 in next frame 804b and each of the different previous blocks in previous frame 804a can be determined. Then, a previous block that has a lowest distortion value can be selected from the different previous blocks, and a motion vector pointing from next block 818 to the selected previous block can be determined and referred to as $MV_{orig\_FW}$. For example, if previous block 816 has a lowest distortion value when compared with other previous blocks, the motion vector $MV_{orig\_FW}$ can be a motion vector 840 pointing from next block 818 to previous block 816.

The motion vector $MV_{orig\_FW}$ can be scaled to obtain a motion vector of target block 812 relative to previous frame 804a based on a temporal distance between previous frame 804a and target frame 802 and a temporal distance between previous frame 804a and next frame 804b. Consistent with the disclosure provided herein, a temporal distance between a first frame and a second frame can be measured as a temporal distance between time stamps (or display orders)

of the first frame and the second frame. For example, a motion vector of target block 812 relative to previous frame 804*a* can be calculated by expressions (7)-(8):

$$MV_{P1}(x)=MV_{orig\_FW}(x)*(T_{P1}-T_{target})/(T_{P1}-T_{N1}), \quad (7)$$

$$MV_{P1}(y)=MV_{orig\_FW}(y)*(T_{P1}-T_{target})/(T_{P1}-T_{N1}). \quad (8)$$

$MV_{P1}(x)$ and $MV_{P1}(y)$ denote an x component and a y component of the motion vector of target block 812 relative to previous frame 804*a*, respectively. $MV_{orig\_FW}(x)$ and $MV_{orig\_FW}(y)$ denote an x component and a y component of the motion vector $MV_{orig\_FW}$, respectively. $T_{P1}$, $T_{N1}$, and $T_{target}$ denote a time stamp or display order of previous frame 804*a*, next frame 804*b*, and target frame 802, respectively. $(T_{P1}-T_{target})$ and $(T_{P1}-T_{N1})$ denote the temporal distance between previous frame 804*a* and target frame 802 and the temporal distance between previous frame 804*a* and next frame 804*b*, respectively.

Then, the motion vector $MV_{orig\_FW}$ can also be scaled to obtain a motion vector of target block 812 relative to next frame 804*b* based on a temporal distance between next frame 804*b* and target frame 802 and the temporal distance between previous frame 804*a* and next frame 804*b*. For example, the motion vector of target block 812 relative to next frame 804*b* can be calculated by expressions (9)-(10):

$$MV_{N1}(x)=MV_{orig\_FW}(x)*(T_{N1}-T_{target})/(T_{P1}-T_{N1}), \quad (9)$$

$$MV_{N1}(y)=MV_{orig\_FW}(y)*(T_{N1}-T_{target})/(T_{P1}-T_{N1}). \quad (10)$$

$MV_{N1}(x)$ and $MV_{N1}(y)$ denote an x component and a y component of the motion vector of target block 812 relative to next frame 804*b*, respectively. $(T_{N1}-T_{target})$ denotes the temporal distance between next frame 804*b* and target frame 802.

Figure 8B:
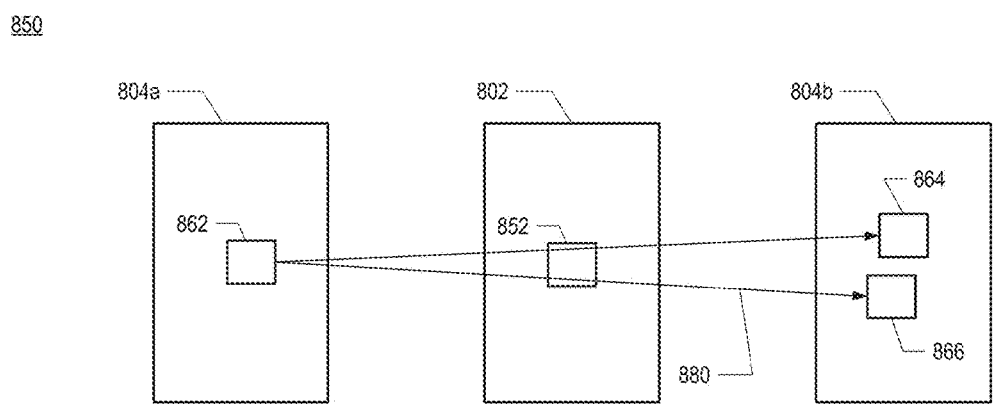
FIG. 8B is a graphical representation illustrating a backward motion estimation process, according to embodiments of the disclosure.

In some embodiments, in the backward motion estimation technique shown in FIG. 8B, a previous block 862 of previous frame 804*a* that is collocated with a target block 852 of target frame 802 is used as a fixed corresponding reference block for target block 812, while different next blocks (e.g., including next blocks 864, 866) in next frame 804*b* are used as corresponding reference blocks for target block 812. A distortion value between previous block 862 in previous frame 804*a* and each of the different next blocks in next frame 804*b* can be determined. Then, a next block that has a lowest distortion value can be selected from the different next blocks, and a motion vector pointing from previous block 862 to the selected next block can be determined and referred to as $MV_{orig\_BW}$. For example, if next block 866 has a lowest distortion value when compared with other next blocks, the motion vector $MV_{orig\_BW}$ can be a motion vector 880 pointing from previous block 862 to next block 866.

The motion vector $MV_{orig\_BW}$ can be scaled to obtain a motion vector of target block 812 relative to next frame 804*b* based on a temporal distance between next frame 804*b* and target frame 802 and a temporal distance between next frame 804*b* and previous frame 804*a*. For example, the motion vector of target block 812 relative to next frame 804*b* can be calculated by expressions (11)-(12):

$$MV_{N1}(x)=MV_{orig\_BW}(x)*(T_{N1}-T_{target})/(T_{N1}-T_{P1}), \quad (11)$$

$$MV_{N1}(y)=MV_{orig\_BW}(y)*(T_{N1}-T_{target})/(T_{N1}-T_{P1}). \quad (12)$$

$MV_{orig\_BW}(x)$ and $MV_{orig\_BW}(y)$ denote an x component and a y component of motion vector $MV_{orig\_BW}$, respectively. Next, the motion vector $MV_{orig\_BW}$ can also be scaled to obtain a motion vector of target block 812 relative to previous frame 804*a* based on a temporal distance between previous frame 804*a* and target frame 802 and a temporal distance between next frame 804*b* and previous frame 804*a*. For example, the motion vector of target block 812 relative to previous frame 804*a* can be calculated by expressions (13)-(14):

$$MV_{P1}(x)=MV_{orig\_BW}(x)*(T_{P1}-T_{target})/(T_{N1}-T_{P1}), \quad (13)$$

$$MV_{P1}(y)=MV_{orig\_BW}(y)*(T_{P1}-T_{target})/(T_{N1}-T_{P1}). \quad (14)$$

It is noted that, when determining motion vectors for a target block using the techniques described in FIGS. 7 and 8A-8B, bias values can also be used in addition to distortion metrics mentioned above so that a more consistent motion vector field can be derived. For example, a spatial correlation between the target block and its neighboring target blocks can be taken into consideration, as well as a temporal correlation between the target block and its collocated reference blocks in the reference frames. Bias values may be calculated based on the differences between a candidate motion vector of the target block and motion vectors from those neighboring target blocks and collocated reference blocks. The bias values may be incorporated into the distortion value (e.g., the SAD value) to determine an overall cost. A candidate motion vector with a lowest overall cost can be determined as a motion vector for the target block.

Figure 9:
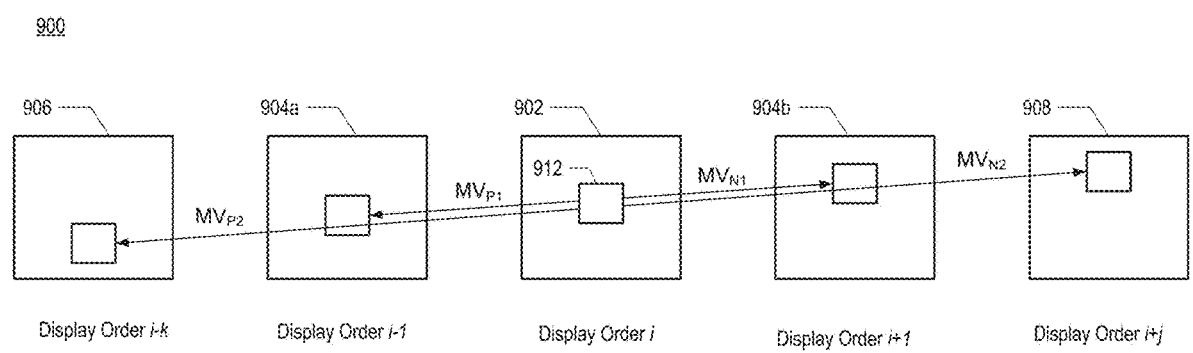
FIG. 9 is a graphical representation illustrating an exemplary motion vector scaling process, according to embodiments of the disclosure.

FIG. 9 is a graphical representation illustrating an exemplary motion vector scaling process 900, according to embodiments of the disclosure. In some embodiments, when more than two reference frames are used for FRUC, motion estimation module 105 may apply one of the techniques described above with reference to FIGS. 7 and 8A-8B to estimate motion vectors of each target block relative to a first previous frame and a first next frame. The first previous and next frames can be, for example, two nearest reference frames (e.g., a nearest previous frame and a nearest next frame). The nearest previous frame can be a previous frame immediately preceding the target frame. The nearest next frame can be a next frame immediately subsequent to the target frame. Motion vectors of the target block relative to other reference frames can be derived through a motion vector scaling process disclosed herein, without applying any of the techniques of FIGS. 7 and 8A-8B because the techniques of FIGS. 7 and 8A-8B are computationally expensive. It is noted that the motion vectors derived through the motion vector scaling process can also be refined by performing a local motion estimation so that accuracy of the motion vectors can be improved.

Referring to FIG. 9, a target frame 902 may be located at a position with a display order of i. A plurality of reference frames may include a first previous frame 904*a* and a first next frame 904*b* located at positions with display orders of i−1, and i+1, respectively. The plurality of reference frames may further include another previous frame 906 and another next frame 908 located at positions with display orders of i−k, and i+j, respectively, where k and j are positive integers, and k may or may not be equal to j.

Initially, a motion vector of a target block 912 relative to first previous frame 904*a* (denoted as $MV_{P1}$) and a motion vector of target block 912 relative to first next frame 904*b* (denoted as $MV_{N1}$) can be determined by applying any of the techniques of FIGS. 7 and 8A-8B. Then, the motion vector $MV_{P1}$ can be scaled to the other previous frame 906 to determine a motion vector of target block 912 relative to the other previous frame 904 (denoted as $MV_{P2}$) based on a temporal distance between the other previous frame 906 and first previous frame 904*a* and a temporal distance between first previous frame 904*a* and target frame 902. For example, the motion vector $MV_{P2}$ of target block 912 relative to the other previous frame 906 can be calculated by expressions (15)-(16):

$$MV_{P2}(x)=MV_{P1}(x)*(T_{P1}-T_{P1})/(T_{P1}-T_{target}), \quad (15)$$

$$MV_{P2}(y)=MV_{P1}(y)*(T_{P2}-T_{P1})/(T_{P1}-T_{target}). \quad (16)$$

$MV_{P1}(x)$ and $MV_{P1}(y)$ denote an x component and a y component of the motion vector $MV_{P1}$ of target block 912 relative to first previous frame 904a, respectively. $MV_{P2}(x)$ and $MV_{P2}(y)$ denote an x component and a y component of the motion vector $MV_{P2}$ of target block 912 relative to the other previous frame 906. $T_{P2}$ denotes a time stamp or display order of the other previous frame 906. $(T_{P2}-T_{P1})$ denotes the temporal distance between the other previous frame 906 and first previous frame 904a.

Then, the motion vector $MV_{N1}$ can be scaled to the other next frame 908 to determine a motion vector of target block 912 relative to the other next frame 908 (denoted as $MV_{N2}$) based on a temporal distance between the other next frame 908 and first next frame 904b and a temporal distance between first next frame 904b and target frame 902. For example, the motion vector $MV_{N2}$ of target block 912 relative to the other next frame 908 can be calculated by expressions (17)-(18):

$$MV_{N2}(x)=MV_{N1}(X)*(T_{N2}-T_{N1})/(T_{N1}-T_{target}), \quad (17)$$

$$MV_{N2}(y)=MV_{N1}(y)*(T_{N2}-T_{N1})/(T_{N1}-T_{target}). \quad (18)$$

$MV_{N1}(x)$ and $MV_{N1}(y)$ denote an x component and a y component of the motion vector $MV_{N1}$ of target block 912 relative to first next frame 904b, respectively. $MV_{N2}(x)$ and $MV_{N2}(y)$ denote an x component and a y component of the motion vector $MV_{N2}$ of target block 912 relative to the other next frame 908. $T_{N2}$ denotes a time stamp or display order of the other next frame 908. $(T_{N2}-T_{N1})$ denotes the temporal distance between the other next frame 908 and first next frame 904b.

By performing similar operations for each target block in target frame 902, motion vectors of all the target blocks relative to the other previous frame 906 and the other next frame 908 can be determined through the motion vector scaling process, without applying any computationally expensive technique of FIGS. 7 and 8A-8B. As a result, more reference frames (e.g., not only the two nearest reference frames) can be used for performing the FRUC of the video data. In some embodiments, motion compensation module 109 can perform a motion compensation operation using different reference frames adaptively instead of only using the nearest reference frames. For example, a motion compensation operation performed by motion compensation module 109 can be conducted by performing a weighted average on matched blocks from a plurality of reference frames beyond those from the two nearest reference frames.

Figure 10A:
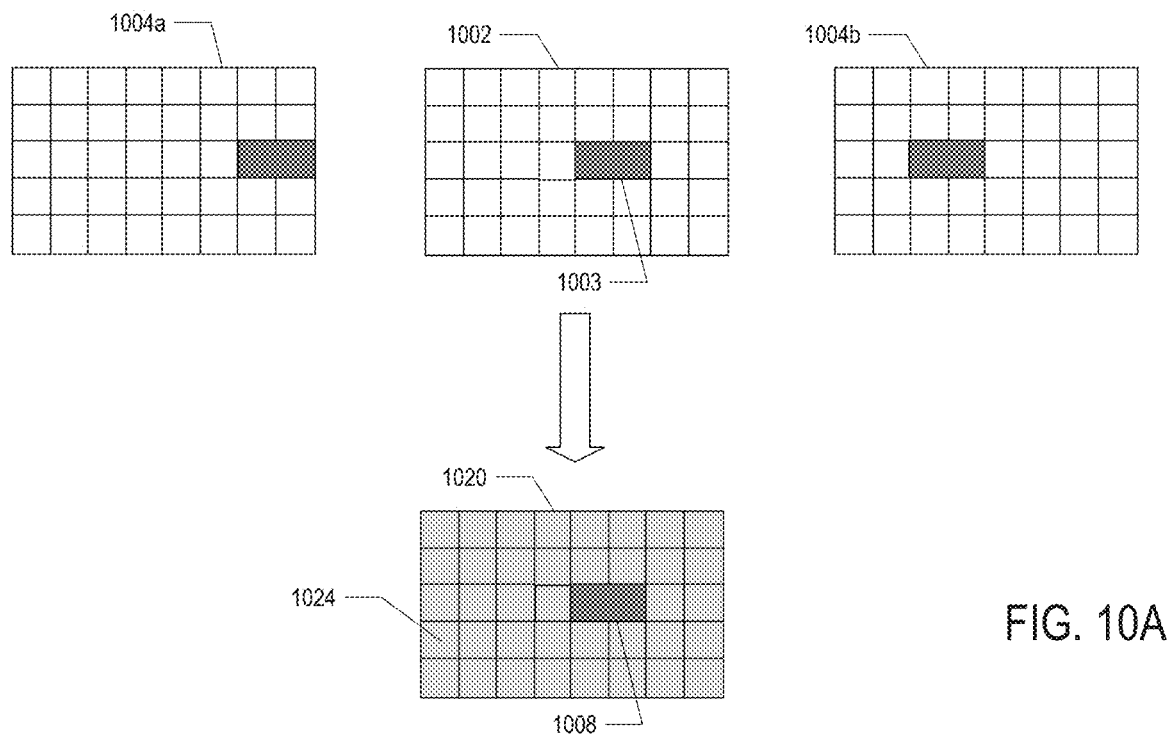
FIG. 10A is a graphical representation illustrating a process for generating an exemplary target object map, according to embodiments of the disclosure.

FIG. 10A is a graphical representation illustrating a process 1000 for generating an exemplary target object map for a target frame, according to embodiments of the disclosure. A target frame 1002, a previous frame 1004a, and a next frame 1004b are shown in FIG. 10A. For example, assuming that two target blocks (shown in an image area 1003 of target frame 1002) may have a same motion vector relative to previous frame 1004a (e.g., the two target blocks move towards left with a same velocity relative to previous frame 1004a). Other target blocks in the remaining image area of target frame 1002 may have a zero motion vector relative to previous frame 1004a. Then, the two target blocks in image area 1003 can be identified as an object 1008 in a target object map 1020, and the other target blocks in the remaining image area of target frame 1002 can be identified as a background object 1024 in target object map 1020.

In another example, the two target blocks in image area 1003 may have a same motion vector relative to next frame 1004b (e.g., the two target blocks move towards right with a same velocity relative to next frame 1004b). The other target blocks in the remaining image area of target frame 1002 may have a zero motion vector relative to next frame 1004b. Then, the two target blocks in image area 1003 can be identified as object 1008 in target object map 1020, and the other target blocks in the remaining image area of target frame 1002 can be identified as background object 1024 in target object map 1020.

As a result, object 1008 may be identified in image area 1003 of target frame 1002 as a moving object that moves towards left. Background object 1024 can be identified in the remaining image area of target frame 1002. Object 1008 may be assigned with a first relative depth value, background object 1024 may be assigned with a second relative depth value, and the first relative depth value is smaller than the second relative depth value. Target object map 1020 can be generated to include object 1008 and background object 1024.

Figure 10B:
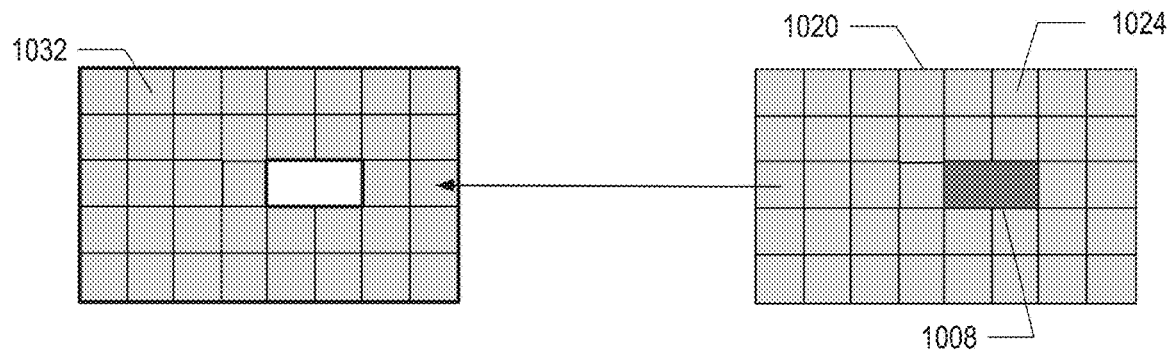
FIGS. 10B-10D are graphical representations illustrating a process for generating an exemplary reference object map based on the target object map of FIG. 10A, according to embodiments of the disclosure.
Figure 10C:
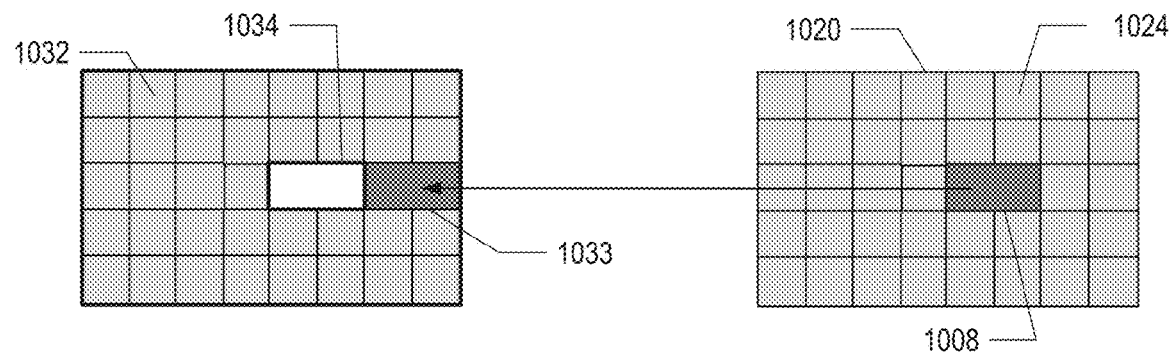
Figure 10D:
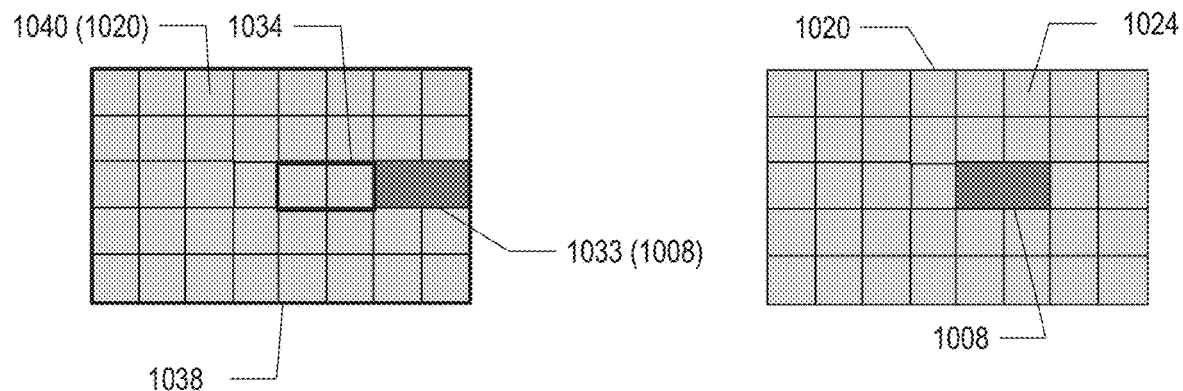

FIGS. 10B-10D are graphical representations illustrating a generation of an exemplary reference object map for previous frame 1004a of FIG. 10A based on target object map 1020 of FIG. 10A, according to embodiments of the disclosure. Referring to FIG. 10B, occlusion detector 107 may project background object 1024 of target object map 1020 onto previous frame 1004a to generate a first object projection in an image area 1032 of previous frame 1004a. Image area 1032 of previous frame 1004 may be identical to an image area of background object 1024 in target object map 1020, since background object 1024 has a zero-motion vector.

Next, referring to FIG. 10C, occlusion detector 107 may project object 1008 of target object map 1020 onto previous frame 1004a to generate a second object projection in an image area 1033 of previous frame 1004a based on motion vectors of target blocks within object 1008.

Referring to FIG. 10D, for image area 1033 of previous frame 1004a where the first and second object projections overlap, the second object projection associated with object 1008 having a smaller relative depth value than background object 1024 is selected. Occlusion detector 107 may determine that image area 1033 of previous frame 1004a is covered by object 1008. As a result, object 1008 is identified in a reference object map 1038 of previous frame 1004a. Each reference block in image area 1033 may have the same relative depth value as object 1008.

For the rest of image area 1032 in previous frame 1004a that is only covered by the first object projection of background object 1024 (e.g., the rest of image area 1032=image area 1032–image area 1033), occlusion detector 107 may determine that the rest of image area 1032 is covered by background object 1024. As a result, background object 1024 is also identified in reference object map 1038 of previous frame 1004a. Since no object projection is generated for an image area 1034 of previous frame 1004a (as shown in FIG. 10C), image area 1034 can be filled by background object 1024. As a result, except in image area 1033, background object 1024 is identified in a remaining image area 1040 of previous frame 1004a (e.g., remaining image area 1040=an entire image area of previous frame 1004a–image area 1033). Each reference block in remaining image area 1040 may be part of background object 1024 and have the same relative depth value as background object 1024.

Figure 10E:
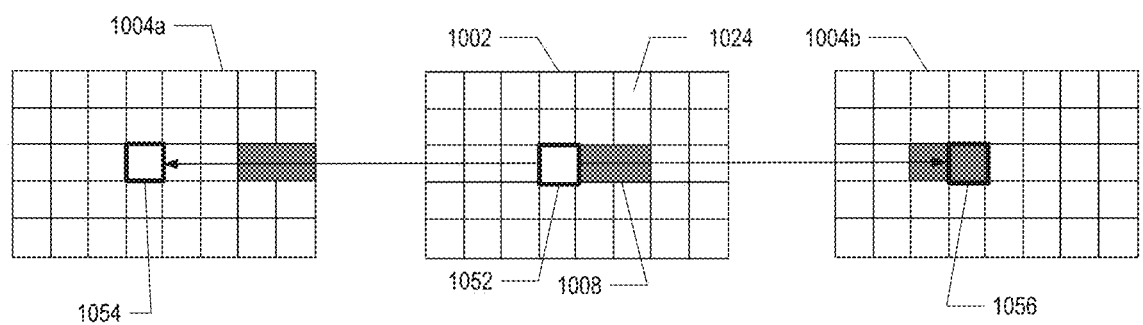
FIG. 10E is a graphical representation illustrating a process for determining an exemplary occlusion detection result for a target block based on the target object map of FIG. 10A, according to embodiments of the disclosure.

FIG. 10E is a graphical representation 1050 illustrating a determination of an exemplary occlusion detection result for a target block based on target object map 1020 of FIG. 10A, according to embodiments of the disclosure. For each target block in target frame 1002, occlusion detector 107 may determine an occlusion detection result for the target block. The occlusion detection result may indicate whether the target block is an occluded target block relative to first previous and next frames 1004a and 1004b.

For example, occlusion detector 107 may determine, based on a motion vector of a target block 1052 relative to previous frame 1004a, a previous block 1054 of previous frame 1004a that corresponds to target block 1052. Occlusion detector 107 may determine a relative depth value of previous block 1054 based on a previous object map of previous frame 1004a (e.g., reference object map 1038 in FIG. 10D). In this example, the relative depth value of previous block 1054 is equal to a relative depth value of target block 1052, which is the second relative depth value of background object 1024. Next, occlusion detector 107 may determine, based on a motion vector of target block 1052 relative to next frame 1004b, a next block 1056 of next frame 1004b that corresponds to target block 1052. Occlusion detector 107 may determine a relative depth value of next block 1056 based on a next object map of next frame 1004b. In this example, the relative depth value of next block 1056 is equal to the first relative depth value of object 1008, which is smaller than that of target block 1052.

Then, occlusion detector 107 may determine the occlusion detection result for target block 1052 based on the relative depth value of target block 1052, the relative depth value of previous block 1054, and the relative depth value of next block 1056. For example, since the relative depth value of target block 1052 is not greater than the relative depth value of previous block 1054 and is greater than the relative depth value of next block 1056, occlusion detector 107 may determine that target block 1052 is a covered occlusion target block relative to previous and next frames 1004a and 1004b. That is, target block 1052 is revealed in previous frame 1004a but covered in next frame 1004b by object 1008 that has a smaller relative depth value. Occlusion detector 107 may determine that a matched block of target block 1052 is previous block 1054 in previous frame 1004a.

Figure 11A:
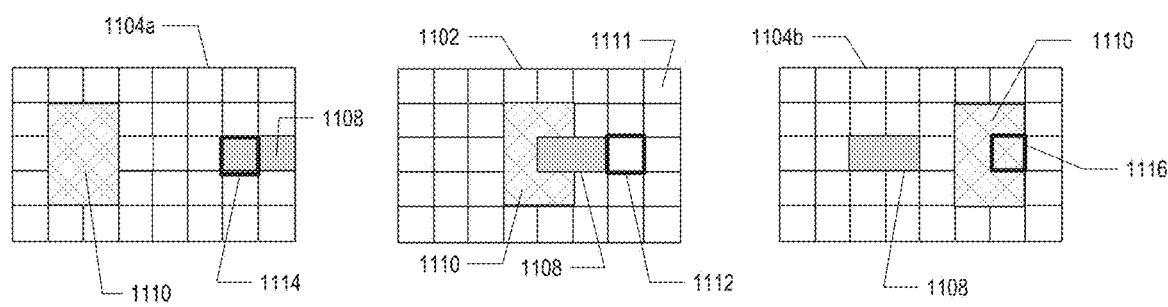
FIG. 11A is a graphical representation illustrating a process for determining a first occlusion detection result for a target block, according to embodiments of the disclosure.

FIG. 11A is a graphical representation illustrating a process 1100 for determining a first occlusion detection result for a target block, according to embodiments of the disclosure. A first previous frame 1104a preceding a target frame 1102 and a first next frame 1104b subsequent to target frame 1102 are shown. Occlusion detector 107 may generate a target object map for target frame 1102 so that objects 1108 and 1110 as well as a background object 1111 are identified in the target object map. For example, object 1108 with motion towards the left is identified in two target blocks of target frame 1102 and is assigned with a first relative depth value. Object 1110 with motion towards the right is identified in six target blocks of target frame 1102 and is assigned with a second relative depth value. Background object 1111 with zero motion is identified in remaining target blocks of target frame 1102 and is assigned with a third relative depth value. The first relative depth value is smaller than the second relative depth value, and the second relative depth value is smaller than the third relative depth value.

Occlusion detector 107 may also generate a first previous object map for first previous frame 1104a so that objects 1108 and 1110 as well as background object 1111 are also identified in the first previous object map. Similarly, occlusion detector 107 may generate a first next object map for first next frame 1104b so that objects 1108 and 1110 as well as background object 1111 are also identified in the first next object map.

For each target block in target frame 1102, occlusion detector 107 may determine a first occlusion detection result for the target block. For example, a target block 1112 is covered by background object 1111 in the target object map and may have the third relative depth value. Occlusion detector 107 may determine, based on a motion vector of target block 1112 relative to first previous frame 1104a, a first previous block 1114 of first previous frame 1104a that corresponds to target block 1112. Occlusion detector 107 may determine a relative depth value of first previous block 1114 based on the first previous object map. For example, since first previous block 1114 is covered by object 1108 in the first previous object map, the relative depth value of first previous block 1114 is equal to the first relative depth.

Next, occlusion detector 107 may determine, based on a motion vector of target block 1112 relative to first next frame 1104b, a first next block 1116 of first next frame 1104b that corresponds to target block 1112. Occlusion detector 107 may determine a relative depth value of first next block 1116 based on the first next object map. For example, since first next block 1116 is covered by object 1110 in the first next object map, the relative depth value of first next block 1116 is equal to the second relative depth.

Then, occlusion detector 107 may determine a first occlusion detection result for target block 1112 based on the relative depth value of target block 1112, the relative depth value of first previous block 1114, and relative depth value of the first next block 1116. For example, since the relative depth value of target block 1112 is greater than the relative depth value of first previous block 1114 and also greater than the relative depth value of first next block 1116, occlusion detector 107 may determine that target block 1112 is a combined occlusion target block relative to first previous and next frames 1104a and 1104b. No matched block can be found for target block 1112 from first previous and next frames 1104a and 1104b.

Figure 11B:
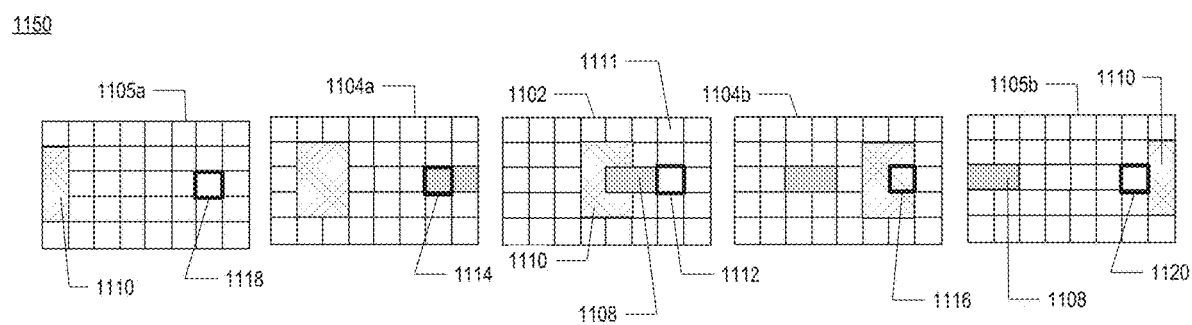
FIG. 11B is a graphical representation illustrating a process for determining a second occlusion detection result for the target block of FIG. 11A, according to embodiments of the disclosure.

FIG. 11B is a graphical representation illustrating a process 1150 for determining a second occlusion detection result for target block 1112 of FIG. 11A, according to embodiments of the disclosure. A second previous frame 1105a preceding first previous frame 1104a and a second next frame 1105b subsequent to first next frame 1104b are shown and used to determine the second occlusion detection result for target block 1112. Occlusion detector 107 may generate a second previous object map for second previous frame 1105a so that object 1110 as well as background object 111 are identified in the second previous object map. Similarly, occlusion detector 107 may generate a second next object map for second next frame 1105b so that objects 1108 and 1110 as well as background object 111 are identified in the second next object map.

Occlusion detector 107 may determine, based on a motion vector of target block 1112 relative to second previous frame 1105a, a second previous block 1118 of second previous frame 1105a that corresponds to target block 1112. Occlusion detector 107 may determine a relative depth value of second previous block 1118 based on the second previous object map. For example, since second previous block 1118 is covered by background object 1111 in the second previous object map, the relative depth value of second previous block 1118 is equal to the third relative depth value of background object 1111.

Next, occlusion detector 107 may determine, based on a motion vector of target block 1112 relative to second next frame 1105b, a second next block 1120 of second next frame 1105b that corresponds to target block 1112. Occlusion detector 107 may determine a relative depth value of second next block 1120 based on the second next object map. For example, since second next block 1120 is covered by background object 1111 in the second next object map, the relative depth value of second next block 1120 is equal to the third relative depth of background object 1111.

Then, occlusion detector 107 may determine a second occlusion detection result for target block 1112 based on the relative depth value of target block 1112, the relative depth value of second previous block 1118, and the relative depth value of the second next block 1120. For example, since the relative depth value of the target block is equal to the relative depth value of second previous block 1118 and the relative depth value of second next block 1120, occlusion detector 107 may determine that target block 1112 is a non-occluded target block relative to second previous and next frames 1105a and 1105b. Matched blocks of target block 1112 can be determined as second previous block 1118 and second next block 1120.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A computer-implemented method for performing frame rate up-conversion of video data including a sequence of image frames, comprising:
   determining, by a video processor, a set of motion vectors of a target frame relative to a plurality of reference frames, wherein the target frame is to be generated and interpolated into the sequence of image frames;
   performing, by the video processor, a motion vector classification on the set of motion vectors to generate a target object map for the target frame;
   projecting, by the video processor, the target object map onto the plurality of reference frames to generate a plurality of reference object maps based on the set of motion vectors; and
   detecting, by the video processor, an occlusion area in the target frame based on the set of motion vectors, the target object map, and the plurality of reference object maps.

2. The method of claim 1, wherein performing the motion vector classification on the set of motion vectors to generate the target object map for the target frame comprises:
   performing the motion vector classification on the set of motion vectors to detect one or more objects in the target frame;
   generating the target object map to include the one or more objects; and
   determining one or more relative depth values of the one or more objects in the target object map.

3. The method of claim 2, wherein performing the motion vector classification on the set of motion vectors to detect the one or more objects in the target frame comprises:
   classifying the set of motion vectors into one or more groups of motion vectors; and
   for each group of motion vectors, determining an object corresponding to the group of motion vectors.

4. The method of claim 3, wherein determining the object corresponding to the group of motion vectors comprises:
   determining one or more target blocks of the target frame, each of the one or more target blocks having a respective motion vector being classified into the group of motion vectors; and
   determining the object to be an image area comprising the one or more target blocks of the target frame.

5. The method of claim 1, wherein the target frame comprises a plurality of target blocks, and projecting the target object map onto the plurality of reference frames to generate the plurality of reference object maps comprises:
   for each reference frame,
       projecting the plurality of target blocks onto the reference frame to generate a plurality of block projections based on motion vectors of the plurality of target blocks relative to the reference frame, respectively; and
       combining the plurality of block projections to generate a reference object map for the reference frame based on the target object map.

6. The method of claim 5, wherein each of the plurality of target blocks has a variable block size.

7. The method of claim 5, wherein the reference frame is divided into a plurality of reference blocks, and combining the plurality of block projections to generate the reference object map for the reference frame comprises:
   for a reference block where two or more block projections of two or more target blocks overlap,
       determining a set of relative depth values associated with the two or more target blocks;
       determining a minimal relative depth value among the set of relative depth values;
       identifying, from the two or more block projections, a block projection associated with a target block having the minimal relative depth value;
       determining that the reference block is covered by an object associated with the target block having the minimal relative depth value such that the object is identified in the reference object map; and
       determining a relative depth value of the reference block to be that of the object.

8. The method of claim 1, wherein detecting the occlusion area in the target frame comprises detecting a set of occluded target blocks from a plurality of target blocks in the target frame.

9. The method of claim 8, wherein the occlusion area comprises a covered occlusion area that includes one or more occluded target blocks having a covered occlusion status, an uncovered occlusion area that includes one or more occluded target blocks having an uncovered occlusion status, or a combined occlusion area that includes one or more occluded target blocks having a combined occlusion status.

10. The method of claim 8, wherein
the plurality of reference frames comprise a first previous frame preceding the target frame and a first next frame subsequent to the target frame;
the plurality of reference object maps comprise a first previous object map for the first previous frame and a first next object map for the first next frame; and
detecting the set of occluded target blocks comprises:
for each target block in the target frame, determining a first occlusion detection result for the target block, wherein the first occlusion detection result indicates whether the target block is an occluded target block relative to the first previous and next frames.

11. The method of claim 10, wherein determining the first occlusion detection result for the target block comprises:
determining, based on a motion vector of the target block relative to the first previous frame, a first previous block of the first previous frame that corresponds to the target block;
determining a relative depth value of the first previous block based on the first previous object map;
determining, based on a motion vector of the target block relative to the first next frame, a first next block of the first next frame that corresponds to the target block;
determining a relative depth value of the first next block based on the first next object map; and
determining the first occlusion detection result for the target block based on a relative depth value of the target block, the relative depth value of the first previous block, and the relative depth value of the first next block.

12. The method of claim 11, wherein determining the first occlusion detection result for the target block comprises:
responsive to the relative depth value of the target block being not greater than the relative depth value of the first previous block and being greater than the relative depth value of the first next block, determining that the target block is an occluded target block having a covered occlusion status relative to the first previous and next frames, a matched block of the target block being the first previous block in the first previous frame.

13. The method of claim 11, wherein determining the first occlusion detection result for the target block comprises:
responsive to the relative depth value of the target block being greater than the relative depth value of the first previous block and being not greater than the relative depth value of the first next block, determining that the target block is an occluded target block having an uncovered occlusion status relative to the first previous and next frames, a matched block of the target block being the first next block in the next previous frame.

14. The method of claim 11, wherein determining the first occlusion detection result for the target block comprises:
responsive to the relative depth value of the target block being greater than the relative depth value of the first previous block and also greater than the relative depth value of the first next block, determining that the target block is an occluded target block having a combined occlusion status relative to the first previous and next frames, the target block having no matched block in the first previous frame and the first next frame.

15. The method of claim 14, wherein
the plurality of reference frames further comprise a second previous frame preceding the first previous frame and a second next frame subsequent to the first next frame;
the plurality of reference object maps further comprise a second previous object map for the second previous frame and a second next object map for the second next frame; and
the method further comprises:
determining a second occlusion detection result for the target block, wherein the second occlusion detection result indicates whether the target block is an occluded target block relative to the second previous and next frames.

16. The method of claim 1, wherein
the plurality of reference frames comprise a first previous frame preceding the target frame and a first next frame subsequent to the target frame; and
determining the set of motion vectors of the target block relative to the plurality of reference frames, respectively, comprises:
dividing the target frame into a plurality of target blocks, and
for each target block, determining a motion vector of the target block relative to the first previous frame and a motion vector of the target block relative to the first next frame.

17. The method of claim 16, wherein
the plurality of reference frames further comprise one or more second previous frames preceding the first previous frame and one or more second next frames subsequent to the first next frame; and
determining the set of motion vectors of the target block relative to the plurality of reference frames, respectively, further comprises:
for each second previous frame, scaling the motion vector of the target block relative to the first previous frame to generate a motion vector of the target block relative to the second previous frame; and
for each second next frame, scaling the motion vector of the target block relative to the first next frame to generate a motion vector of the target block relative to the second next frame.

18. A system for performing frame rate up-conversion of video data including a sequence of image frames, comprising:
a memory configured to store the sequence of image frames; and
a video processor coupled to the memory and configured to:
determine a set of motion vectors of a target frame relative to a plurality of reference frames, wherein the target frame is to be generated and interpolated into the sequence of image frames;
perform a motion vector classification on the set of motion vectors to generate a target object map for the target frame;
project the target object map onto the plurality of reference frames to generate a plurality of reference object maps based on the set of motion vectors; and
detect an occlusion area in the target frame based on the set of motion vectors, the target object map, and the plurality of reference object maps.

19. The system of claim 18, wherein to perform the motion vector classification on the set of motion vectors to generate the target object map for the target frame, the video processor is further configured to:
- perform the motion vector classification on the set of motion vectors to detect one or more objects in the target frame;
- generate the target object map to include the one or more objects; and
- determine one or more relative depth values of the one or more objects in the target object map.

20. A non-transitory computer-readable storage medium configured to store instructions which, when executed by a video processor, cause the video processor to perform a process for performing frame rate up-conversion of video data including a sequence of image frames, the process comprising:
- determining a set of motion vectors of a target frame relative to a plurality of reference frames, wherein the target frame is to be generated and interpolated into the sequence of image frames;
- performing a motion vector classification on the set of motion vectors to generate a target object map for the target frame;
- projecting the target object map onto the plurality of reference frames to generate a plurality of reference object maps based on the set of motion vectors; and
- detecting an occlusion area in the target frame based on the set of motion vectors, the target object map, and the plurality of reference object maps.

* * * * *